United States Patent
Oh et al.

(10) Patent No.: US 10,680,741 B2
(45) Date of Patent: Jun. 9, 2020

(54) METHOD AND APPARATUS FOR RECEIVING DOWNLINK DATA THROUGH INTERFERENCE SIGNAL CANCELLATION AND SUPPRESSION IN WIRELESS COMMUNICATION SYSTEM

(71) Applicant: Samsung Electronics Co., Ltd., Gyeonggi-do (KR)

(72) Inventors: Jinyoung Oh, Seoul (KR); Hyojin Lee, Gyeonggi-do (KR); Cheolkyu Shin, Gyeonggi-do (KR); Juho Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 111 days.

(21) Appl. No.: 15/502,424

(22) PCT Filed: Aug. 20, 2015

(86) PCT No.: PCT/KR2015/008704
§ 371 (c)(1),
(2) Date: Feb. 7, 2017

(87) PCT Pub. No.: WO2016/028101
PCT Pub. Date: Feb. 25, 2016

(65) Prior Publication Data
US 2017/0230135 A1    Aug. 10, 2017

(30) Foreign Application Priority Data
Aug. 20, 2014    (KR) .................. 10-2014-0108270

(51) Int. Cl.
*H04L 1/00*    (2006.01)
*H04W 72/04*   (2009.01)
(Continued)

(52) U.S. Cl.
CPC .............. *H04L 1/001* (2013.01); *H04J 11/00* (2013.01); *H04J 11/005* (2013.01);
(Continued)

(58) Field of Classification Search
None
See application file for complete search history.

(56) References Cited

U.S. PATENT DOCUMENTS

2012/0176982 A1    7/2012  Zirwas et al.
2013/0208604 A1    8/2013  Lee et al.
(Continued)

FOREIGN PATENT DOCUMENTS

| CN | 103733676 | 4/2014 |
| KR | 1020150128274 | 11/2015 |
| WO | WO 2011/018121 | 2/2011 |

OTHER PUBLICATIONS

PCT/ISA/210 Search Report issued on PCT/KR2015/008704 (pp. 3).
(Continued)

*Primary Examiner* — Ayaz R Sheikh
*Assistant Examiner* — Sori A Aga
(74) *Attorney, Agent, or Firm* — The Farrell Law Firm, P.C.

(57) ABSTRACT

The present disclosure relates to a communication technique and a system thereof for fusing, with IoT technology, a 5G communication system for supporting a higher data transmission rate than a beyond 4G system. The present disclosure may be applied to intelligent services (such as smart homes, smart buildings, smart cities, smart cars or connected cars, health care, digital education, retail business, security and safety related services, etc.). The present disclosure relates to a method for receiving downlink data of a terminal in a wireless communication system, and suggests a method (Continued)

and an apparatus for receiving downlink data, the method comprising: a step for checking a transmission parameter regarding data being transmitted from an interference cell; a step for determining, on the basis of the transmission parameter, whether or not an interference signal exists; a step for determining, on the basis of any one of the transmission parameter and the determination on whether or not an interference signal exists, whether or not network assisted interference cancellation and suppression (NAICS) technology is applied; and a step for decoding the downlink data on the basis of the determination on whether or not the NAICS technology is applied.

16 Claims, 16 Drawing Sheets

(51) Int. Cl.
   *H04J 11/00* (2006.01)
   *H04L 5/00* (2006.01)
(52) U.S. Cl.
   CPC .......... *H04L 1/0038* (2013.01); *H04L 5/0007* (2013.01); *H04L 5/0048* (2013.01); *H04L 5/0073* (2013.01); *H04W 72/042* (2013.01); *H04J 11/0056* (2013.01)

(56) References Cited

U.S. PATENT DOCUMENTS

| | | | |
|---|---|---|---|
| 2015/0326324 A1 | 11/2015 | Lee et al. | |
| 2016/0119936 A1* | 4/2016 | Kim | H04J 11/0053 370/329 |

OTHER PUBLICATIONS

PCT/ISA/237 Written Opinion issued on PCT/KR2015/008704 (pp. 7).
3GPP TSG RAN WG1 Meeting #78, Dresden, Germany, Aug. 18-22, 2014, Remaining issues for NAICS higher-layer signaling, pp. 6.
3GPP TSG RAN WG1 Meeting #78, Dresden, Germany, Aug. 18-22, 2014, Reamining details on higher-layer signaling for NAICS, pp. 6.
3GPP TSG RAN1 #77, Seoul, Korea, May 19-23, 2014, Remaining Details on Transmission Parameters for NAICS, pp. 5.
3GPP TSG RAN WG1 Meeting #78, Dresden, Germany, Aug. 18-22, 2014, Remaining open issues on network assistance for NAICS receivers, pp. 4.
3GPP TSG RAN WG1 Meeting #78, Dresden, Germany, Aug. 18-22, 2014, Remaining issues on network assistance signalling parameters, pp. 4.
MediaTek Inc., "Remaining Issues on HL-Signaling Parameters for NAICS", R1-142918, 3GPP TSG-RAN WG1 #78, Aug. 18-22, 2014, 5 pages.
Intel Corporation, "Discussion on NAICS TM10 Interference Handling", R4-145250, 3GPP TSG-RAN WG4 Meeting #72, Aug. 18-22, 2014, 6 pages.
Chinese Office Action dated Apr. 27, 2018 issued in counterpart application No. 201580055366.1, 18 pages.
European Search Report dated Mar. 26, 2018 issued in counterpart application No. 15833959.8-1220, 9 pages.
MediaTek Inc., "Summary of Email Discussion on NAICS Higher-Layer Signaling", R1-143147, 3GPP TSG RAN WG1 Meeting #78, Aug. 18-22, 2014, 30 pages.
Samsung et al., "WF on NAICS", R4-143846, 3GPP TSG-RAN WG4 RAN4 #71, May 19-23, 2014, 3 pages.
Japanese Office Action dated May 20, 2019 issued in counterpart application No. 2017-509676, 11 pages.

* cited by examiner

METHOD AND APPARATUS FOR RECEIVING DOWNLINK DATA THROUGH INTERFERENCE SIGNAL CANCELLATION AND SUPPRESSION IN WIRELESS COMMUNICATION SYSTEM

PRIORITY

This application is a National Phase Entry of PCT International Application No. PCT/KR2015/008704 which was filed on Aug. 20, 2015, and claims priority to Korean Patent Application No. 10-2014-0108270, which was filed on Aug. 20, 2014, the contents of each of which are incorporated herein by reference.

TECHNICAL FIELD

The present invention relates to a downlink data reception method and apparatus for use in a wireless communication system and, in particular, to a method and apparatus for canceling and suppressing interference in the downlink data.

BACKGROUND ART

In order to meet the increasing demand for wireless data traffic since the commercialization of 4G communication systems, the development focus is on the $5^{th}$ Generation (5G) or pre-5G communication system. For this reason, the 5G or pre-5G communication system is called a beyond 4G network communication system or post Long Term Evolution (LTE) system. In order to accomplish high data rates, consideration is being given to implementing the 5G communication system on the millimeter Wave (mm Wave) band (e.g., 60 GHz band). In order to mitigate propagation loss and increase propagation distance, the 5G communication system is likely to accommodate various techniques such as beamforming, massive MIMO, Full Dimensional MIMO (FD-MIMO), array antenna, analog beamforming, and large scale antenna. Also, for throughput enhancement of the 5G communication system, research is being conducted on various techniques such as small cell, advanced small cell, cloud radio access network (cloud RAN), ultra-dense network, Device to Device (D2D) Communication, wireless backhaul, moving network, cooperative communication, Coordinated Multi-Points (CoMP), and interference cancellation. Furthermore, the ongoing research includes the use of Hybrid FSK and QAM modulation and Sliding Window Superposition Coding (SWSC) as Advanced Coding Modulation (ACM), Filter Bank Multi Carrier (FBMC), Non-Orthogonal Multiple Access (NOMA), and Sparse Code Multiple Access (SCMA).

Meanwhile, the Internet is evolving from a human-centric communication network in which information is generated and consumed by humans to the Internet of Things (IoT) in which distributed things or components exchange and process information. The combination of the cloud server-based Big data processing technology and the IoT begets Internet of Everything technology. In order to secure the sensing technology, wired/wireless communication and network infrastructure, service interface technology, and security technology required for implementing the IoT, recent research has focused on sensor network, Machine to Machine (M2M), and Machine Type Communication (MTC) technologies. In the IoT environment, it is possible to provide an intelligent Internet Technology that is capable of collecting and analyzing data generated from connected things to create new values for human life. The IoT can be applied to various fields such as smart home, smart building, smart city, smart car or connected car, smart grid, health care, smart appliance, and smart medical service through legacy Information Technology (IT) and convergence of various industries.

Thus there are various attempts to apply the IoT to the 5G communication system. For example, sensor network, Machine to Machine (M2M), and Machine Type Communication (MTC) technologies are implemented by means of the 5G communication technologies such as beamforming, MIMO, and array antenna. The application of the aforementioned cloud RAN as a big data processing technology is an example of convergence between the 5G and IoT technologies.

The mobile communication system has evolved to a high-speed, high-quality wireless packet data communication system capable of providing data and multimedia services beyond the early voice-oriented services. Recently, various mobile communication standards, such as High Speed Downlink Packet Access (HSDPA), High Speed Uplink Packet Access (HSUPA), Long Term Evolution (LTE), and LTE-Advanced (LTE-A) defined in $3^{rd}$ Generation Partnership Project (3GPP); High Rate Packet Data (HRPD) defined in $3^{rd}$ Generation Partnership Project-2 (3GPP2); and 802.16 defined in IEEE, have been developed to support the high-speed, high-quality wireless packet data communication services. In particular, LTE is a communication standard developed to support high speed packet data transmission and to maximize the throughput of the radio communication system with various radio access technologies. LTE-A is the evolved version of LTE for improving data transmission capability.

Typically, LTE base stations and terminals are based on 3GPP Release 8 or 9 while LTE-A base stations and terminals are based on 3GPP Release 10. The 3GPP standard organization is preparing for the next release for more improved performance beyond LTE-A.

The existing $3^{rd}$ and $4^{th}$ generation wireless packet data communication systems (such as HSDPA, HSUPA, HRPD, and LTE/LTE-A) adopt Adaptive Modulation and Coding (AMC) and channel sensitive scheduling techniques to improve the transmission efficiency.

AMC allows the transmitter to adjust the data amount to be transmitted in adaptation to the channel condition. That is, the transmitter is capable of decreasing the data transmission amount for poor channel condition so as to maintain the received signal error probability at a certain level or increasing the data transmission amount for good channel condition so as to transmit large amount of information efficiently while maintaining the received signal error probability at an intended level.

Channel sensitive scheduling allows the transmitter to serve the user having good channel conditions selectively among a plurality of users, thereby increasing the system capacity in comparison with serving a single user by allocating a channel fixedly. This increase in system capacity is referred to as multi-user diversity gain Both the AMC and channel sensitive scheduling are methods of adopting the best modulation and coding scheme at the most efficient time based on the partial channel state information feedback from the receiver.

In case of using AMC along with the Multiple Input Multiple Output (MIMO) transmission scheme, it may be necessary to take into consideration a number of spatial layers and ranks for transmitting signals. In this case, the transmitter determines the optimal data rate in consideration of the number of layers for use in MIMO transmission as well as coding rate and modulation scheme.

A MIMO scheme for transmitting radio signals with a plurality of transmit antennas is categorized into one of two main categories: Single User MIMO (SU-MIMO) for transmitting signals to one terminal and Multi User MIMO (MU-MIMO) for transmitting signals to multiple users. In the case of the SU-MIMO scheme, multiple transmit antennas are used for transmitting multiple radio signal streams to a single user over a plurality of spatial layers. At this time, the receiver has to have a plurality of receive antennas to support multiple spatial layers. In the case of MU-MIMO, multiple transmit antennas are used for transmitting multiple radio signal streams to multiple users over a plurality spatial layers.

In comparison with SU-MIMO, MU-MIMO is advantageous in that there is no need for the receiver to have multiple receive antennas. However, the radio signals transmitted to different receivers using the same frequency and time resources are likely to interfere with each other.

Recently, much research has been conducted to replace the Code Division Multiple Access (CDMA) used in the legacy $2^{nd}$ and $3^{rd}$ mobile communication systems with Orthogonal Frequency Division Multiple Access (OFDMA) for the next generation mobile communication system. The 3GPP and 3GPP2 are in the middle of standardization of the OFDMA-based evolved system. OFDMA is expected to provide superior system throughput compared with CDMA. One of the main factors that allows OFDMA to increase system throughput is the frequency domain scheduling capability. Like the channel sensitive scheduling scheme which is capable of achieving the capacity gain through scheduling in adaptation to the time-varying channel condition, it is possible to achieve more capacity gain using the frequency-varying channel characteristic.

FIG. 1 is a diagram illustrating a time-frequency resource grid utilized in an LTE/LTE-A system.

In FIG. 1, the radio resources for transmission from the evolved Node B (eNB) to a User Equipment (UE) are divided into Resource Blocks (RBs) in the frequency domain and subframes in the time domain. In the LTE/LTE-A system, an RB consists of 12 consecutive carriers and has a bandwidth of 180 kHz. Meanwhile, a subframe consists of 14 OFDM symbols and spans 1 msec. The LTE/LTE-A system allocates resources for scheduling in unit of subframe in the time domain and in unit of RB in the frequency domain.

In the LTE/LTE-A system, scheduling is performed by allocating resources in unit of time domain subframe and frequency domain RB.

FIG. 2 is a diagram illustrating radio resources corresponding to a subframe and an RB as a smallest resource allocation unit for downlink scheduling in an LTE/LTE-A system.

The radio resources depicted in FIG. 2 are of one subframe in the time domain and one RB in the frequency domain. The radio resources consist of 12 subcarriers in the frequency domain and 14 OFDM symbols in the time domain, i.e. 168 unique frequency-time positions. In LTE/LTE-A, each frequency-time position is referred to as a Resource Element (RE). One subframe consists of two slots, and each slot consists of 7 OFDM symbols.

The resources can be structured for transmitting multiple different types of signals as shown in FIG. 2. Examples of the different types of signals may include a Cell Specific Frequency Signal (CRS) 200, a Demodulation Reference Signal (DMRS) 202, a Physical Downlink Shared Channel (PDSCH) 204, a Channel Status Information Reference Signal (CSI-RS) 206, and other control channel signals 208.

The CRS is a reference signal broadcast for all UEs within a cell (i.e., cell-specific signal).

The DMRS is a reference signal transmitted to a specific UE (i.e., UE-specific signal).

The PDSCH is a data channel for downlink transmission. The PDSCH designed for an eNB to transmit data traffic to a UE may be used for transmitting reference signals at the REs that are not used in the data region 210 of the radio resources.

The CSI-RS is a reference signal transmitted for the UEs located within a cell for use in channel state measurement. It may be possible for multiple CSI-RSs to be transmitted within a cell.

Other control channel signals 208 may be the signals carrying control information for use by a UE in receiving PDSCH or ACK/NACK concerning Hybrid Automatic Repeat Request (HARQ) that is transmitted in correspondence to uplink data transmission. Examples of the control channel signals may include Physical Hybrid-ARQ Indicator Channel (PHICH), Physical Control Format Indicator Channel (PCFICH), and Physical Downlink Control Channel (PDCCH).

In addition to the above signals, muting may be configured in order for the UEs within the corresponding cells to receive the CSI-RSs transmitted by different eNBs in the LTE-A system. The muting can be mapped to the positions designated for CSI-RS, and in general the UE receives the traffic signal skipping the corresponding radio resource. In the LTE-A system, muting is referred to as zero power CSI-RS (ZP CSI-RS). Muting by nature is mapped to the CSI-RS position without transmit power allocation.

In FIG. 2, the CSI-RS can be transmitted at some of the positions marked by A, B, C, D, E, F, G, H, I, and J according to the number of antennas transmitting CSI-RS. Also, the zero power CSI-RS (muting) can be mapped to some of the positions A, B, C, D, E, F, G, H, I, and J.

The CSI-RS can be mapped to 2, 4, or 8 REs according to the number of the antenna ports for transmission. For two antenna ports, half of a specific pattern is used for CSI-RS transmission; for four antenna ports, all of the specific pattern is used for CSI-RS transmission; and for eight antenna ports, two patterns are used for CSI-RS transmission.

Meanwhile, muting is always performed by pattern. That is, although the muting may be applied to plural patterns, if the muting positions mismatch CSI-RS positions, muting cannot be applied to one pattern partially. However, if the CSI-RS positions match the zero power CSI-RS (muting) positions, the muting can be applied to a part of one pattern.

In a cellular system, the reference signal has to be transmitted for downlink channel state measurement. In the case of the 3GPP LTE-A system, the UE measures the channel state with the eNB using the CSI-RS transmitted by the eNB.

The channel state is measured in consideration of a few factors including downlink interference. The downlink interference includes the interference caused by the antennas of neighbor eNBs and thermal noise, which are important in determining the downlink channel condition. For example, in the case that an eNB with one transmit antenna transmits a reference signal to the UE with one receive antenna, the UE has to determine the energy per symbol that can be received in downlink and any interference amount that may be received for the duration of receiving the corresponding symbol to acquire the Signal to Noise plus Interference Ratio (SNIR). The SNIR is the value obtained by dividing the received signal power by interference and noise signal strength. Typically, the signal reception performance and data rate is in proportion to the SNIR. If the SNIR is determined, the UE reports to the eNB the determined SNIR, a value corresponding to the SNIR, or a maximum data rate corresponding to the SNIR such that the eNB determines the downlink data rate for the UE.

In a mobile communication system, it is typical that a base station is located at the center of each cell and equipped with one or more antennas for supporting mobile communication of mobile stations. A mobile communication system in which the antennas belonging to one cell are arranged at the same position is referred to as Centralized Antenna System (CAS). Meanwhile, a mobile communication system in which the antennas belonging to one cell are distributed within the cell is referred to as Distributed Antenna System (DAS).

FIG. 3 is a diagram illustrating an antenna arrangement of a legacy distributed antenna system.

FIG. 3 exemplifies a distributed antenna system comprised of 2 cells 300 and 310.

For example, a cell 300 includes one high power transmit antenna 320 and four low power transmit antennas 340. The high power transmit antenna 320 is configured to provide at least minimum service within the coverage area of the cell while the low power transmit antennas 340 are configured to provide the UEs with the service at a high data rate within a restricted area of the cell. All of the high and low power transmit antennas 320 and 340 are connected to a central controller as denoted by reference number 330 and operating according to scheduling and radio resource allocation of the central controller. In the distributed antenna system, one or more antennas may be arranged at each of the geographically distributed antenna positions. In the distributed antenna system, the antenna(s) deployed at the same position is referred to as Remote Radio Head (RRH)

In the distributed antenna system as exemplified in FIG. 3, the UE receives the signal radiated by one geometrically distributed antenna group, but it regards the signals radiated by other antenna groups as interference.

FIG. 4 is a diagram illustrating an exemplary interference situation where multiple antenna groups transmit signals to different UEs in a distributed antenna system.

In FIG. 4, the solid arrows represent desired signals, and the dotted arrows represent interference. The User Equipment (UE) 1 400 is receiving traffic signals from the antenna group 410. Meanwhile, the UE2 420 is receiving signals from the antenna group 430, the UE3 440 from the antenna group 450, and the UE4 460 from the antenna group 470. While receiving the traffic signals radiated by the antenna group 410, the UE1 400 undergoes interference caused by the traffic signals radiated from other antenna groups to other UEs. That is, the signals transmitted through the antenna groups 430, 450, and 470 cause interference to the UE1 400.

In the distributed antenna system, the interference caused by other antenna groups may be categorized into two categories: inter-cell interference and intra-cell interference. The inter-cell interference is a type of interference occurring between the antenna groups belonging to different cells, and the intra-cell interference is a type of interference occurring between the antenna groups belonging to one cell.

In FIG. 4, the UE 1 undergoes intra-cell interference from the antenna group 430 of the same cell (i.e., cell 1) and inter-cell interference from the antenna groups 450 and 470 of a neighbor cell (i.e., cell 2. The inter-cell interference and the intra-call interference may have a negative effect on the data channel reception of the UE.

Typically, the signal received by a UE consists of the desired signal, noise, and interference. The received signal may be expressed by equation (1).

$$r = s + \text{noise} + \text{interference} \quad (1)$$

Here, "r" denotes the received signal, "s" denotes the transmitted signal, "noise" denotes noise with Gaussian distribution, and "interference" denotes interferer signals occurring in radio communication.

The interference may be caused by the signal radiated from a neighboring transmission point (e.g., neighboring cell) or the identical transmission point (e.g., serving cell). The neighboring transmission point interference is observed when a signal transmitted from a neighboring cell or radiated from a neighboring antenna of the distributed system affects the desired signal. The identical transmission point interference is observed when the signals destined for different users interfere with each other in the case of MU-MIMO transmission in which one transmission point uses multiple transmit antennas.

The SNIR varies according to the amount of interference, which affects the reception performance. In the cellular mobile communication system, the ability to control interference (as one of the main factors contributing to system performance degradation) efficiently determines the system performance.

In LTE/LTE-A, consideration is being given to introducing various standardized techniques to support a Network Assisted Interference Cancellation and Suppression (NA-ICS) technology in order to improve reception performance in an interference situation. The NAICS technology is characterized in that an eNB transmits to the corresponding UE the interferer signal information through a network in order for the UE to recover the transmitted signal in consideration of the characteristics of the interferer signal. If the UE is aware of the modulation scheme applied to the interferer signal, it may cancel the interferer signal or recover the transmitted signal in consideration of the interferer signal to improve the reception performance.

In a wireless communication system, an error correction code is used to correct errors occurring during communication. In an LTE/LTE-A system, a convolution code and a turbo code are used as error correction codes. In order to improve the decoding performance of the error correction code, the receiver uses soft decision making rather than hard decision making in demodulating the symbol modulated with QPSK, 16QAM, 64QAM, or the like. If "+1" or "−1" is transmitted by the transmitter, the receiver, which makes a hard decision, selects one of "+1" and "−1" and outputs the selection result. In contrast, the receiver, which makes a soft decision, outputs the information indicating the selection made between "+1" and "−1" and the reliability of decision making. The reliability information can be used for improving the decoding performance in the decoding process. Typically, the receiver that makes soft decision making uses a Log Likelihood Ratio (LLR) for calculating the output value. In the case that a BPSK modulation scheme having the output value of "+1" or "−1" is applied to the transmission signal, the LLR is defined as follows.

$$LLR = \log \frac{f(r \mid s = +1)}{f(r \mid s = -1)} \quad (2)$$

In equation (2), "r" denotes the reception signal, and "s" denotes the transmission signal. The conditional probability density function $f(r|s=+1)$ is of the reception signal under the assumption that "+1" is transmitted as the transmission signal. In the QPSK, 16QAM, and 64QAM schemes, the LLR can be expressed in a similar way. The conditional probability density function has Gaussian distribution in the situation where interference exists.

FIG. 5 is a diagram illustrating an exemplary conditional probability density function graph.

In FIG. 5, the first curve 500 denotes a conditional probability density function $f(r|s=-1)$, and the second curve 510 denotes another conventional probability density function $f(r|s=+1)$. In the case that the received signal has the value corresponding to the second curve 510, the receiver calculates LLR with log(f2/f1). The conditional probability density functions of FIG. 5 correspond to the case where the noise and interference have Gaussian distribution.

In the LTE/LTE-A mobile communication system, an eNB transmits a few dozen or more bits of information to the UE through single Physical Downlink Shared Channel (PDSCH) transmission. The eNB encodes the information to be transmitted to the UE and modulates the encoded information with a modulation scheme such as QPSK, 16QAM, and 64QAM. Accordingly, if the PDSCH is received, the UE may generate LLRs of a few dozen or more coded symbols to the decoder.

Typically, noise has Gaussian distribution, but interference may not have Gaussian distribution depending on the situation. The reason why interference does not have Gaussian distribution is that the interference is a radio signal in view of other receivers. That is, since the "interference" of equation (1) denotes radio signals transmitted to other receivers, at least one of the BPSK, QPSK, 16QAM, and 64QAM schemes is applied thereto. In an exemplary case that the interferer signal is modulated with BPSK, the interference has a probability distribution of "+k" or "−k" at the same probability. Here, "k" is a value determined by the signal strength attenuation effect on the radio channel.

FIG. 6 is a diagram illustrating an exemplary conditional probability density function graph under the assumption that both the desired signal and interferer signal are modulated with BPSK. In FIG. 6, it is assumed that the noise has Gaussian distribution.

It can be observed that the conditional probability density function of FIG. 6 differs from that of FIG. 5. In FIG. 6, the first curve 620 denotes the conditional probability density function $f(r|s=-1)$, and the second curve 630 denotes the conditional probability density function $f(r|s=+1)$. The size of the distribution distance 610 is determined according to the signal strength of the interferer signal and depends on the influence of the radio channel. In the case that the received signal value corresponds to the first curve 600 of FIG. 6 with the conditional probability density function, the receiver calculates LLR with log(f4/f3). This value differs from the LLR value in the case of FIG. 5 because of the difference in conditional probability density function. That is, the LLR obtained in consideration of the modulation scheme of the interferer signal differs from the LLR obtained under the assumption of Gaussian distribution.

FIG. 7 is a graph illustrating an exemplary conditional probability density function under the assumption that the interferer signal is modulated with 16QAM while the desired signal is modulated with BPSK.

In FIG. 7, the first curve 700 denotes the conditional probability density function $f(r|s=-1)$, and the second curve 710 denotes the conditional probability density function $f(r|s=+1)$. FIG. 7 shows that the conditional probability density function may be modified when the modulation scheme of the interference differs from that of the desired signal. The desired signal is modulated with BPSK in both the cases of FIGS. 6 and 7, while the interference is modulated with BPSK in FIG. 6 and 16QAM in FIG. 7. That is, although the desired signal is modulated with the same modulation scheme, the conditional probability density function varies according to the modulation scheme of the interferer signal, resulting in different LLRs.

As described with reference to FIGS. 5, 6, and 7, LLR may vary according to the interference that the receiver assumes for LLA calculation. In order to optimize the reception performance, it is necessary to calculate LLR using the conditional probability density function reflecting the statistical characteristic of the real interference or after canceling interference in advance. That is, if the interference is modulated in BPSK, the receiver has to calculate LLR under the assumption that the interferer signal is modulated with BPSK. In the state that the interference has been modulated with BPSK, if the receiver assumes Gaussian distribution or 16QAM, it fails to obtain the optimal LLR, resulting in degradation of reception performance.

DISCLOSURE

Technical Problem

The present invention provides a method and apparatus for using interference control information to improve downlink reception performance of a UE in a cellular mobile communication system. Also, the present invention provides an interference control and canceling method and apparatus of a UE that is capable of performing interference control and cancellation operations with low complexity in an interference environment with a plurality of virtual cell identifiers (VCIDs) and scrambling identifier (nSCIDs).

The objects of the present invention are not limited to the aforesaid, and other objects not described herein with be clearly understood by those skilled in the art from the descriptions below.

Technical Solution

In accordance with an aspect of the present invention, an interference cancellation method of a terminal in a mobile communication system includes receiving transmission parameters of at least one interferer channel; determining whether the interferer channel supports a predetermined transmission mode (TM) among available TMs; performing, when the interferer channel supports the predetermined TM, blind detection with a group of virtual cell identifier-scrambling identifier (VCID-SCID) combinations of the interferer channel; and canceling interference to the UE based on a result of the blind detection, wherein the predetermined transmission mode is configured for one terminal to receive Physical Downlink Shared Channel (PDSCH) from one or more transmission points.

In accordance with another aspect of the present invention, an interference cancellation apparatus of a terminal in a mobile communication system includes a communication unit for communication with at least one network node and a control unit which controls the communication unit to receive transmission parameters of at least one interferer channel, determines whether the interferer channel supports a predetermined transmission mode (TM) among available TMs, and controls to perform, when the interferer channel supports the predetermined TM, blind detection with a group of virtual cell identifier-scrambling identifier (VCID-SCID) combinations of the interferer channel and canceling interference to the UE based on a result of the blind detection, wherein the predetermined transmission mode is configured for one terminal to receive Physical Downlink Shared Channel (PDSCH) from one or more transmission points.

Advantageous Effects

The method and apparatus of the present invention is advantageous in terms of effective interference control and cancellation operation. Also, the method and apparatus of the present invention is advantageous in terms of allowing a UE to control and suppress interference with a low complexity in an interference environment with a plurality of virtual cell identifiers and scrambling identifiers.

The advantages of the present invention are not limited to the aforesaid, and other advantages not described herein will be clearly understood by those skilled in the art from the descriptions below.

MODE FOR INVENTION

Figure 1:
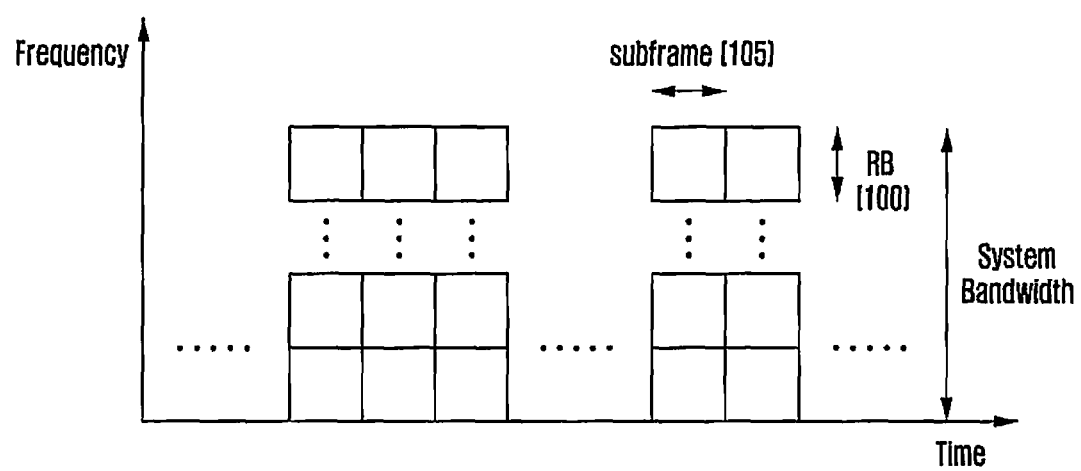
FIG. 1 is a diagram illustrating a time-frequency resource grid utilized in an LTE/LTE-A system.
Figure 2:
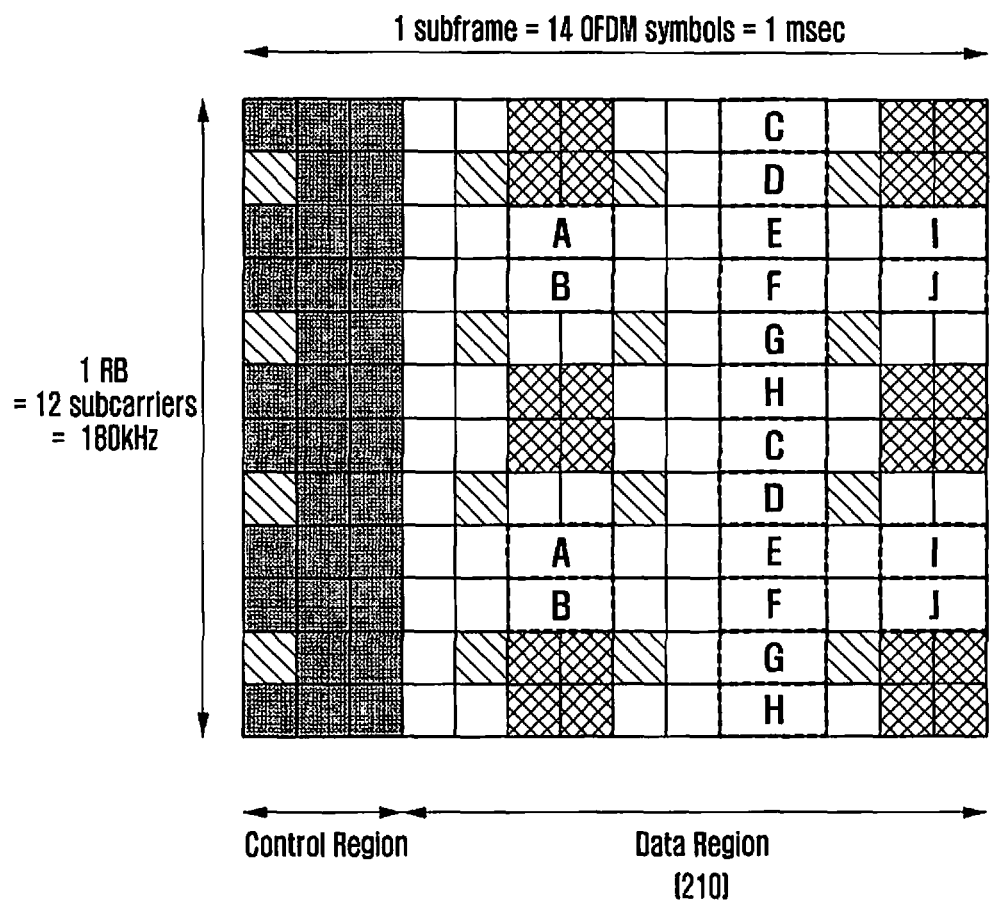
FIG. 2 is a diagram illustrating radio resources corresponding to a subframe and an RB as a smallest resource allocation unit for downlink scheduling in an LTE/LTE-A system.
Figure 3:
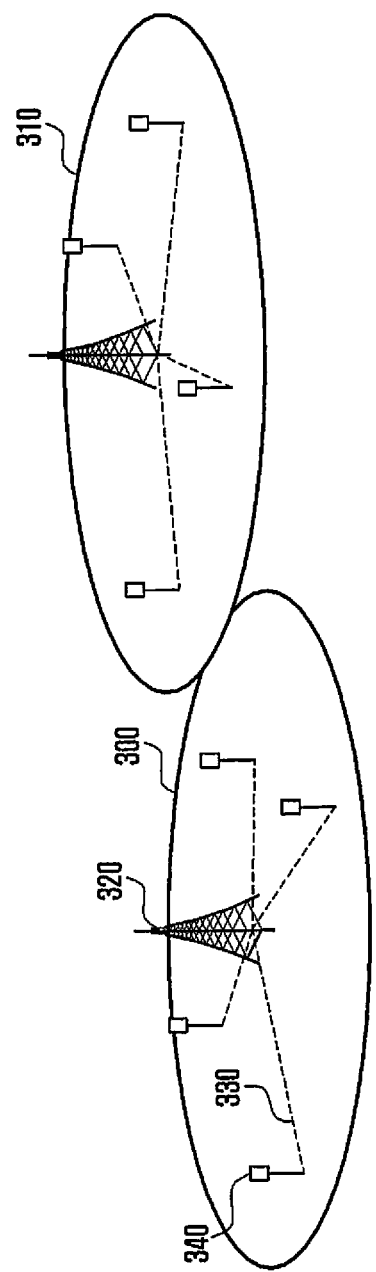
FIG. 3 is a diagram illustrating antenna arrangement of a legacy distributed antenna system.
Figure 4:
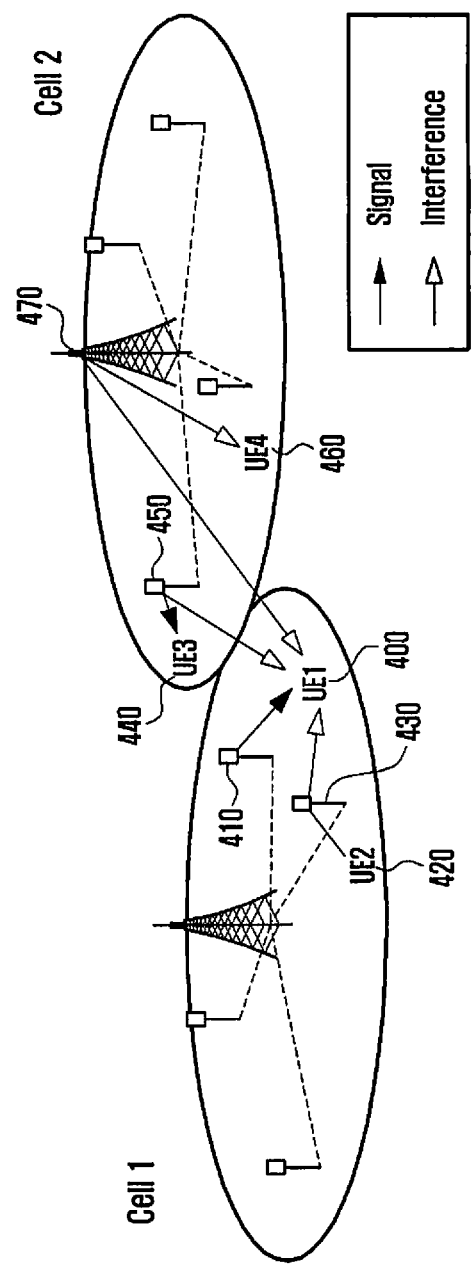
FIG. 4 is a diagram illustrating an exemplary interference situation where multiple antenna groups transmit signals to different UEs in a distributed antenna system.
Figure 5:
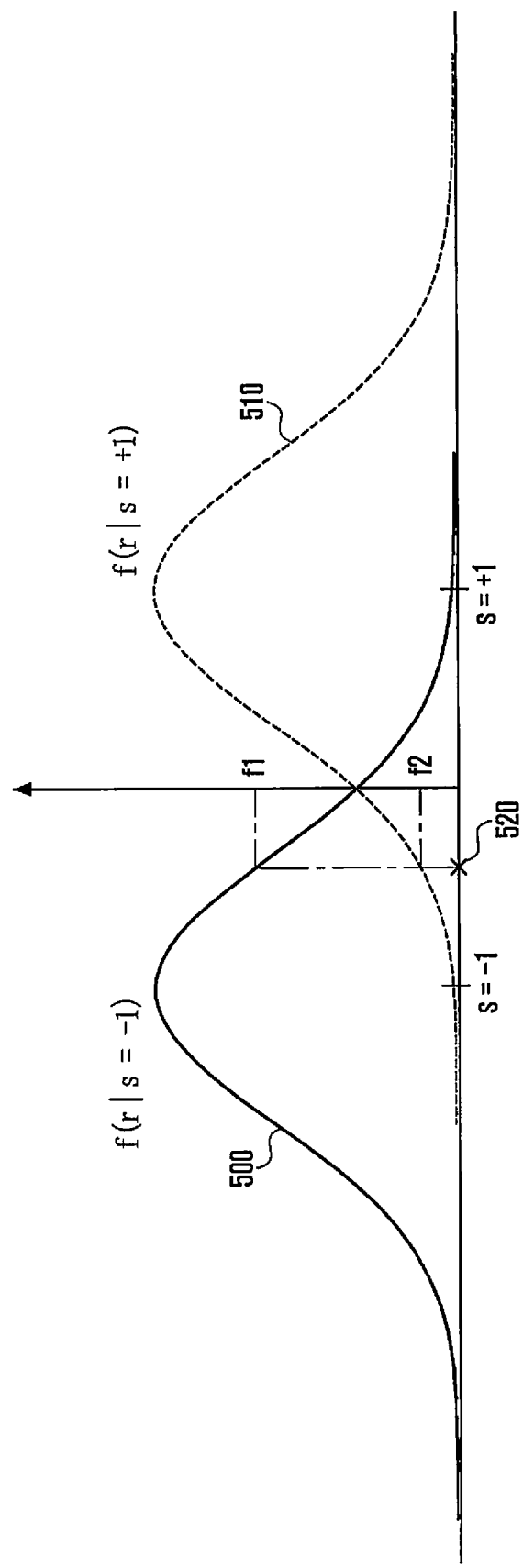
FIG. 5 is a diagram illustrating an exemplary conditional probability density function graph.
Figure 6:
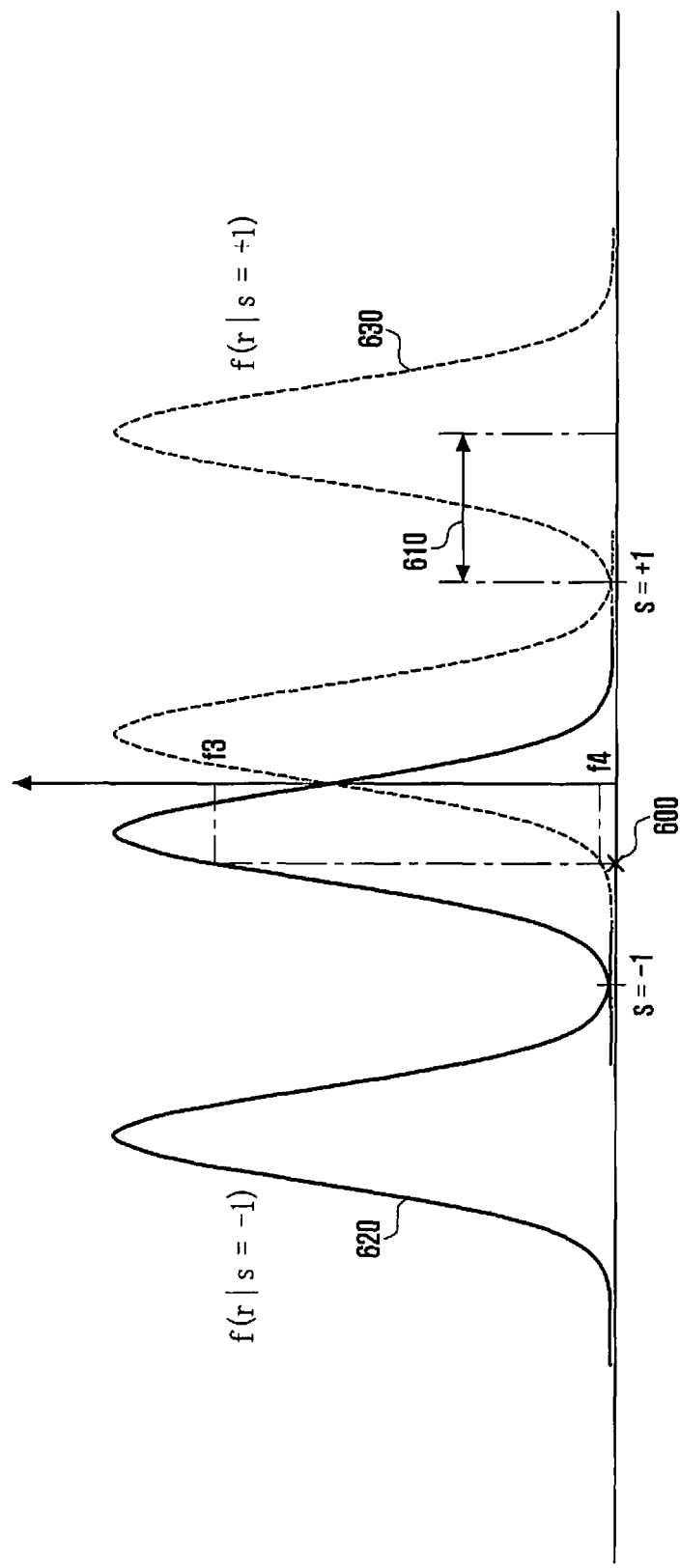
FIG. 6 is a diagram illustrating another exemplary conditional probability density function graph.
Figure 7:
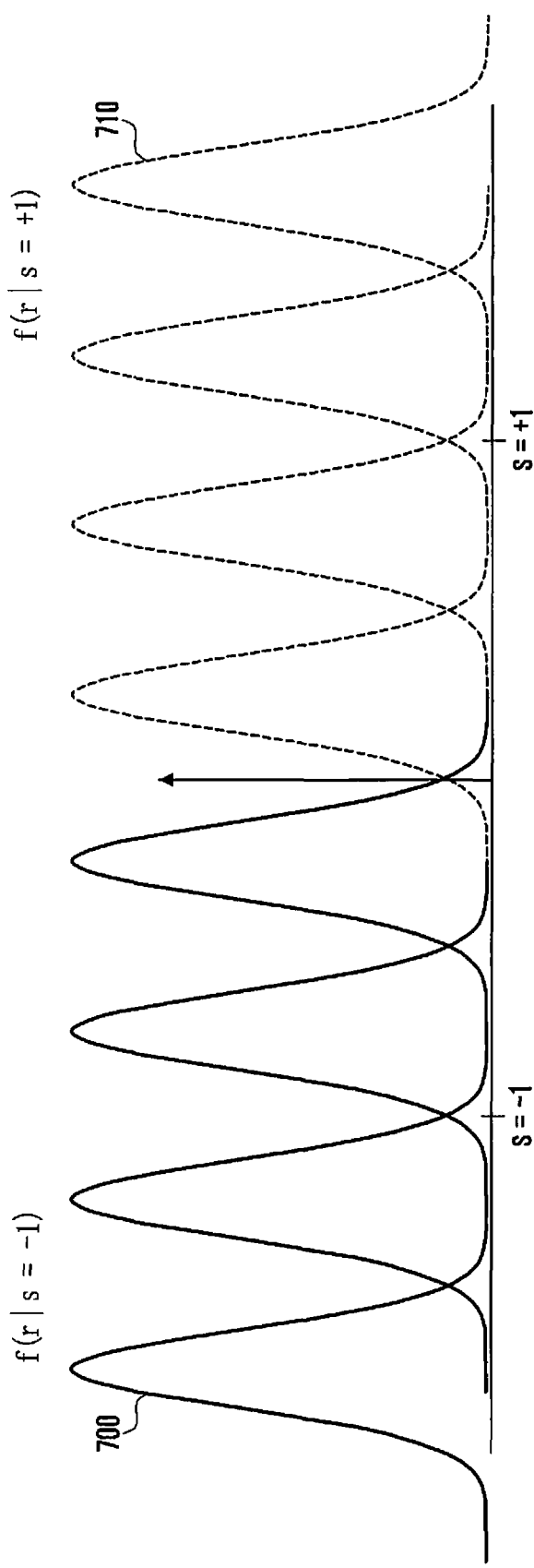
FIG. 7 is a diagram illustrating still another exemplary conditional probability density function graph.

Exemplary embodiments of the present invention are described in detail with reference to the accompanying drawings. Detailed descriptions of well-known functions and structures incorporated herein may be omitted to avoid obscuring the subject matter of the present invention. Further, the following terms are defined in consideration of the functionality in the present invention, and they may vary according to the intention of a user or an operator, usage, etc. Therefore, the definition should be made based on the overall content of the present specification.

Although the description is directed to the OFDM-based radio communication system, particularly the 3GPP Evolved Universal Terrestrial Radio Access (EUTRA), it will be understood by those skilled in the art that the present invention can be applied even to other communication systems having a similar technical background and channel format, with a slight modification, without departing from the spirit and scope of the present invention.

Prior to explaining the invention in detail, exemplary meanings of some terms commonly used in the specification are provided hereinafter. However, the exemplary meanings are not intended to be limiting of the invention.

As a main entity for communicating with a UE, the base station may be referred to interchangeably as BS, NodeB (NB), eNodeB (eNB), and Access Point (AP).

As another main entity for communicating with the base station, the User Equipment may be referred to interchangeably as UE, Mobile Station (MS), Mobile Equipment (ME), device, and terminal.

Exemplary embodiments of the present invention are described in detail with reference to the accompanying drawings. Detailed descriptions of well-known functions and structures incorporated herein may be omitted to avoid obscuring the subject matter of the present invention. Further, the following terms are defined in consideration of the functionality in the present invention, and they may vary according to the intention of a user or an operator, usage, etc. Therefore, the definition should be made on the basis of the overall content of the present specification. The main entity responsible for allocating resources to a terminal may be one of an eNodeB, an eNB, a Base Station (BS), a radio access unit, a base station controller, and any network node.

The terminal may be one of a User Equipment (UE), a Mobile Station (MS), a cellular phone, a smartphone, a computer, and a communication-enabled multimedia system. Although the following description is directed to the E-UTRA (LTE) and Advanced E-UTRA (LTE-A), it will be understood by those skilled in the art that the present invention can be applied event to other communication systems having a similar technical background and channel format, with a slight modification, without departing from the spirit and scope of the present invention.

In LTE/LTE-A, consideration is being given to introducing various methods to support Network Assisted Interference Cancellation and Suppression (NAICS) technology in order to improve reception performance in an interference situation by canceling or suppressing such interference. The NAICS technology is characterized by an eNB transmitting to the corresponding UE the interferer signal information through a network in order for the UE to recover the transmitted signal in consideration of the characteristics of the interferer signal. If the UE-is aware of the modulation scheme applied to the interferer signal, it may cancel the interferer signal or recover the transmitted signal in consideration of the interferer signal to improve the reception performance.

Figure 8:
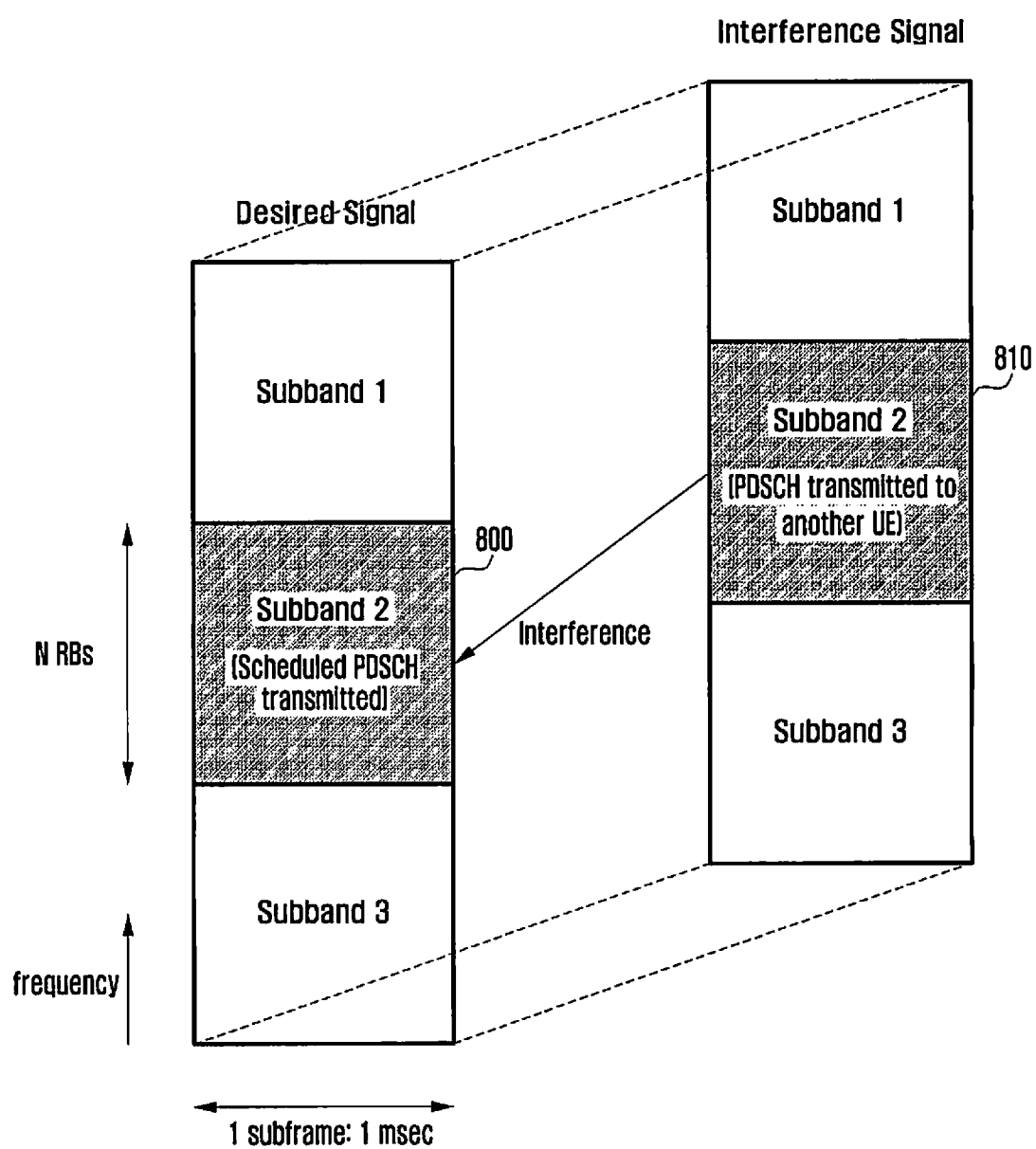
FIG. 8 is a diagram for explaining an interference situation in an LTE/LTE-A system.

A description is made thereof with reference to FIG. 8 hereinafter. FIG. 8 is a diagram for explaining an interference situation in an LTE/LTE-A system.

In reference to FIG. 8, the UE attempts to receive the radio signal 800. At this time, the signal 810 transmitted to another UE causes interference to the UE. In FIG. 8, it is assumed that the desired signal and the interferer signal are transmitted across N Resource Blocks (RBs).

In FIG. 8, the UE has to calculate LLR after canceling the interferer signal 810 or using the conditional probability density function calculated accurately by reflecting statistical characteristics of the interferer signal, during the desired signal detection process, in order to improve the reception performance. The UE has at least to have information on the modulation scheme and received signal strength of the interferer signal. In the case of the LTE/LTE-A system, the UE has at least to have information on one of the transmission parameters concerning the interference as shown in Table 1 in order to check the modulation scheme and received signal strength of the interferer signal. Without being limited thereto, however, the UE may acquire the information on the interferer signal using other parameters as well as the transmission parameters listed in Table 1. For example, the UE may acquire channel information on the corresponding signal using Quasi-co-location (QCL) information between the CRS and CSI-RS of the interferer.

TABLE 1

| Interference-related transmission parameter | Description of transmission parameter |
| --- | --- |
| CRS information of interfering cell | Cell identifier (cell ID) |
| | Number of CRS antenna ports |
| | Multicast-Broadcast Single Frequency Network (MBSFN) subframe information |
| | Energy Per Resource Element (EPRE) ratio of data RE to CRS RE: PA (UE-specific parameter provided by upper layer), PB (cell-specific parameter provided by upper layer) [see 3GPP TS 36.213 Section 5.2] |
| CSI-RS information of interfering cell | CSI-RS information of interfering cell: number of CSI-RS antenna ports |
| Network deployment information of interfering cell | Inter-eNB synchronization information |
| | Cyclic prefix information |
| | Slot number information |
| | Uplink/Downlink configuration information |
| enhanced PDCCH (ePDCCH) information of interfering cell | ePDCCH information of interfering cell |
| Transmission Mode (TM) of interferer's PDSCH | TM of interfering PDSCH |
| Dynamic transmission information concerning interfering PDSCH | Modulation order |
| | RI (Rank Indicator): Number of transmission streams of interfering PDSCH |
| | PMI (Precoding-Matrix Indicator): precoding information of interfering PDSCH |
| | DMRS Information (DMRSI): DMRS antenna port information (DMRS-AP), DMRS sequence information (virtual cell ID, scrambling ID) |
| | Control Format Indicator (CFI) information: PCFICH, PDCCH, PHICH |
| Scheduling information of interferer's PDSCH | Resource Allocation (RA) granularity RA type |

In an LTE/LTE-A system, the Transmission Mode (TM) of an interferer's PDSCH, among the interference transmission parameters, may be one of TM1 to TM10. The PDSCH transmission methods for TM are specified in the 3GPP Technical Specification (TS) 36.213; thus, a detailed description thereof is omitted herein.

Part of the interferer's transmission parameters may be transmitted from the eNB to the UE, and another part of the parameters may be directly acquired through a blind detection. If the eNB informs the UE of a set of candidate values of a specific transmission parameter, the UE may perform blind detection on the available candidate parameters to detect the corresponding transmission parameter value of the interferer signal.

A description is made of the blind detection procedure for modulation order and PMI information of an interferer signal hereinafter. It is assumed that part of the interferer's transmission parameters (e.g., DMRS information of interfering cell, network deployment information of interfering cell, and control channel (PDCCH) transmission region information) are transmitted from the eNB to the UE through higher layer signaling or determined by the UE through blind detection. At this time, if it is determined that the transmission mode of the interfering PDSCH may be any of part of the TMs operating based on DMRS, the signal received by the UE may be expressed as equation (3) for explaining the method of performing blind detection on the modulation order/RI/PMI of the interferer signal of the UE.

$$y_k = H_k^s x^s + H_k^I x^I + w \quad (3)$$

In equation (3), $H_k^s$ denotes a channel from the eNB serving the UE to the UE at the $k^{th}$ RE, and $x^s$ denotes a transmission signal vector transmitted to the UE. Also, $H_k^I$ denotes a channel carrying the interferer signal at the $k^{th}$ RE, $x^I$ denotes the interferer signal, and w denotes the Gaussian noise having the variance of $\sigma^2$. Then, as one of the methods for performing blind detection on the modulation order/PMI of the interferer signal of the UE, the Approximated Maximum Likelihood (AML) detection method is expressed as equation (4).

$$\{\hat{P}, \hat{S}\} = \underset{\{P_{RI}, S_n\}}{\operatorname{argmax}} \left( \frac{1}{N_{RE}} \sum_{k=1}^{N_{RE}} \left( -\frac{1}{\sigma^2} \left\| y_k - \hat{H}'_{p,k} s_{min}^P \right\|^2 \right) - \ln(\pi\sigma^2 |S_n|) \right) \quad (4)$$

In equation (4), $\hat{H}_{p,k'}$ denotes a matrix of channels carrying the interferer signal and being estimated with the DMRS and available precoding matrices for the interfering cells. $P_{RI}$ denotes the precoding matrices available for the corresponding rank value. Here, the transmission ranks applicable to the interferer signal and the precoding matrices for the ranks may include all of the ranks and precoding matrices specified for DMRS ports in the LTE/LTE-A standards. That is, the UE may generate the interferer DMRS with the cell ID (CID) or virtual cell ID (VCID), scrambling ID (SCID), and precoding matrices for use in configuring interferer DMRS and then detect the modulation order of the interferer signal for the respective DMRS ports (e.g., Port 7 and Port 8) based on the interferer DMRS using the AML detection method represented by equation (4). Through per-DMRS port detection, it is possible to detect a rank value of the interferer signal.

In equation (4), Sn denotes the signal constellation for modulation order n and, in LTE/LTE-A, n may be set to 2, 4, and 6 (or 8) for QPSK, 16QAM, and 64QAM (or 256 QAM), respectively. Also, $|S_n|$ denotes a number of elements in the signal constellation and is calculated as $2^n$. $S_{min}^{P_R}$ denotes the symbol having a minimum Euclidean distance from the reception vector among the elements in the given signal constellation for the given rank and precoding matrix and may be expressed by equation (5).

$$s_{min}^P = \underset{s \in S_n}{\operatorname{argmin}} \|y_k - H'_{p,k} s\|^2 \qquad (5)$$

Finally, if $N_{RE}$ of equation (4) and a set of the Resource Element (RE) samples for use in blind detection are determined, the UE can perform blind detection on the modulation order/PMI through the AML method. The RE sample set for use by the UE in blind detection of modulation order/PMI has to have the same modulation order/PMI and the same power level. Accordingly, the UE has to perform blind detection using only the PDSCH REs with the exception of CRS, DMRS, PDSCH, control channels, CSI-RS, and muting REs in one Resource Block (RB). Here, equations (4) and (5) are just examples of the interferer signal detection method; it may also be possible to detect interferer signals using other detection methods with similar characteristics.

Embodiment 1

Embodiment 1 is directed to a blind detection operation of a UE for an interferer's additional transmission parameters when the transmission mode for Physical Downlink Shared Channel (PDSCH) is TM10 or when the candidate transmission modes for an interferer's PDSCH include TM10. In this embodiment, it is assumed that the candidate transmission modes of interferers operate based on DMRS. However, it will be understood by those skilled in the art that the present invention can be applied even to the CRS-based transmission modes with a slight modification without departing form the spirit and scope of the present invention.

The TM10 is a transmission mode configured for one UE to receive the desired signal (PDSCH) from one or more Transmission Points (TPs). The TM10 supports Coordinated Multipoint (CoMP) transmission. The UE may receive a signal from one transmission point at a predetermined time point, and the transmission point transmitting PDSCH to the UE may vary over time. In this case, the eNB may notify the UE of the transmission point that transmits PDSCH using a control channel. In order to perform the above operation efficiently, it is necessary to configure a virtual cell ID (or VCID) and a scrambling ID (or nSCID) to each transmission point, in addition to the physical cell ID (or PCID), for identification of the transmission point in the LTE/LTE-A system. That is, the UE configured in TM10 may be allocated the virtual cell ID and scrambling ID for two transmission points being used by the eNB for transmitting PDSCH. For example, the UE may be allocated the virtual cell ID and scrambling ID for the transmission points in the form of VCID3-0 and VCID2-1. Then the eNB may notify the UE of the transmission points for use in PDSCH transmission through a control channel, i.e. a bit indicating nSCID in the Downlink Control Information (DCI) format 2D. That is, if the nSCID is set to 0, the UE may configure the transmission point identified by VCID3.

Accordingly, if the interferer's transmission mode is TM10 or if the candidate transmission mode set of the interferer includes TM10, the UE may receive a plurality of virtual cell IDs and scrambling IDs concerning the interferences from the eNB through higher layer signaling. A description is made hereinafter of the blind detection operation of the UE based on the plural virtual cell IDs and scrambling IDs received from the eNB.

For example, the UE may receive the virtual IDs and scrambling IDs of the interferers that are expressed as VCID1-0, VCID2-1, VCID3-0, VCID4-1, VCID5-0, and VCID6-1 from the eNB for interference control and suppression operations. Here, VCID1-0 denotes a combination of the virtual cell ID 1 and the scrambling ID 0. At this time, the UE may perform blind detection to acquire an additional parameter of the interferer using the interferer's DMRS information, which includes the virtual cell ID and scrambling ID. The additional parameter may be the information on the modulation order for the interference channel.

The above-operation is carried out as described hereinafter.

Figure 9:
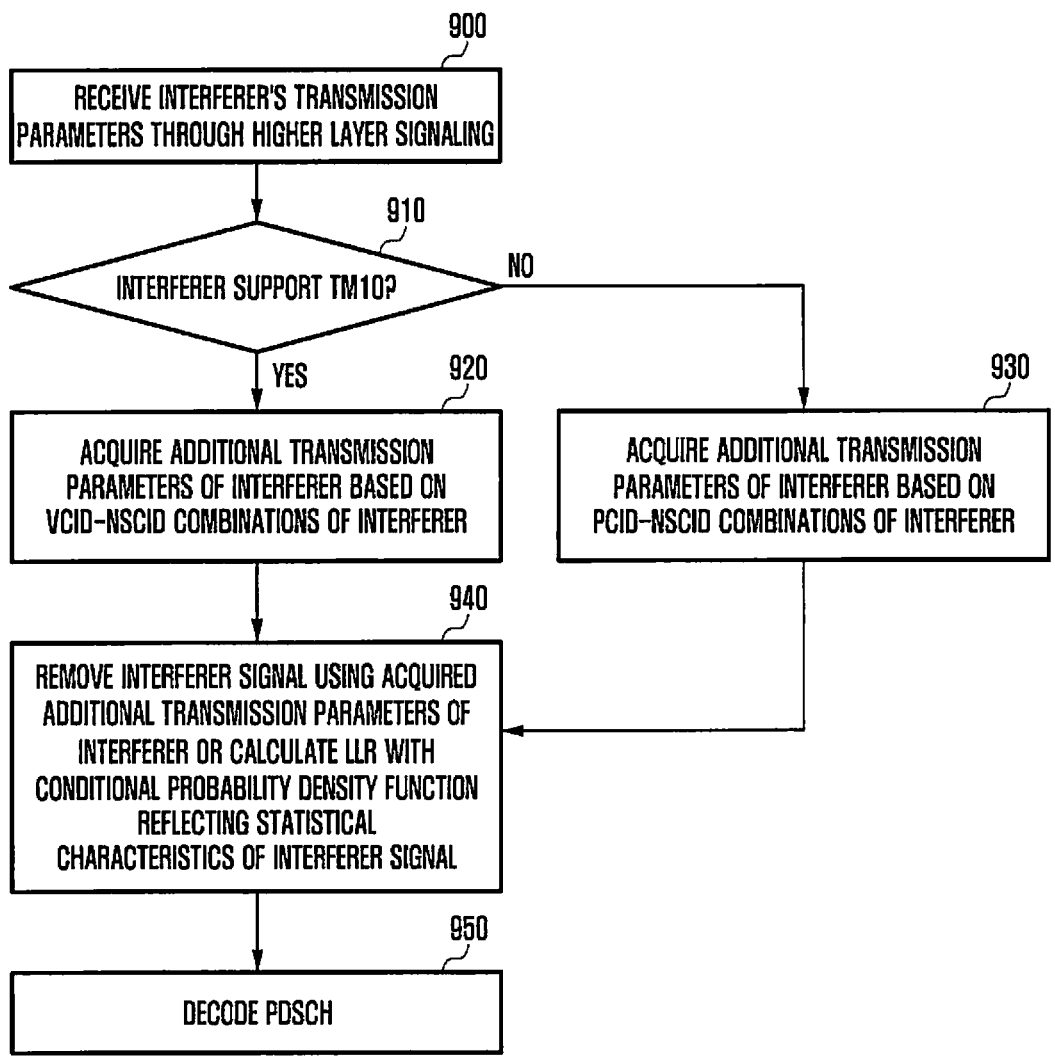
FIG. 9 is a flowchart illustrating a downlink data reception method of a UE according to embodiment 1.

FIG. 9 is a flowchart illustrating a downlink data reception method of a UE according to embodiment 1.

In reference to FIG. 9, the UE may receive an interferer's transmission parameters from an eNB through higher layer signaling at step 900. For example, the UE may receive at step 900 part of an interferer's transmission parameters as shown in Table 1. In this embodiment, it is assumed that the transmission modes are limited to the transmission modes operating based on DMRS. Accordingly, the UE may receive part of physical cell ID, virtual cell ID, and scrambling ID of the interferer at step 900.

The UE may determine at step 910 whether the transmission modes of the interferer include TM10. If it is determined at step 910 that the transmission modes of the interferer determined at step 900 include TM10, the UE performs an additional detection operation at step 920 to acquire an additional transmission parameter based on the virtual cell ID and scrambling ID received at step 900. The additional transmission parameter may be dynamic transmission information concerning the interferer's PDSCH. The additional transmission parameter may be dynamic transmission information of an interfering cell that causes the most aggressive interference to the UE. For example, the dynamic transmission information concerning the interferer's PDSCH may include at least one of modulation order, Rank Indicator (RI), and Precoding Matrix Indicator (PMI). However, the parameters are not limited to the PDSCH-related dynamic information. The PDSCH-related dynamic information may be called additional transmission parameter of interferer.

If it is determined at step 910 that the transmission modes of the interferer do not include TM10, the UE may perform an additional detection operation at step 930 to acquire an additional transmission parameter. At step 930, the UE may acquire the additional parameter of the interferer based on the combination of the Physical cell ID (PCID) and nSCID.

Step 920 is described in more detail hereinafter.

If the transmission modes of the interferer include TM10, the UE may receive a virtual cell ID and scrambling ID for the interference at step 900. In this case, the UE may generate a DMRS sequence (Cinit) for the interference using the virtual cell ID and scrambling ID through equation (6).

$$c_{init} = (\lfloor n_s/2 \rfloor + 1) \cdot (2n_{ID}^{(nSCID)} + 1) \cdot 2^{16} + n_{SCID} \qquad (6)$$

Here, $n_{ID}^{(nSCID)}$ denotes the virtual cell ID which is provided to the UE through higher layer signaling. $n_s$ denotes the slot number, and $n_{SCID}$ denotes the scrambling ID having a value of 0 or 1. The UE can estimate the interference channel using the DMRS sequence (Cinit) acquired through equation (6).

The UE may detect the signals corresponding to the antenna ports p=7 and p=8 from the signals received at the DMRS positions. The signals received at REs corresponding to the DMRS positions and designated for antenna ports p=7 and p=8 may be expressed by equation (5).

$$y = X_s h_s + X_I h_I + n \quad (7)$$

Here, $X_s$ and $X_I$ denote diagonal matrices representing, respectively, the desired DMRS and interferer DMRS for the UE, and $h_s$ and $h_I$ denote vectors representing, respectively, the desired signal channel component and interferer signal component. Also, n denotes noise and other interference components for the UE which may be modeled as a probability variable with independent Gaussian distribution. The UE receives the transmission parameters concerning the desired signal from the serving cell to estimate the information related to the desired signal ($X_s$ and $h_s$). If the UE may remove the signal transmitted thereto (i.e., desired signal) from the received signal, equation (7) may be modified to equation (8).

$$\tilde{y} = y - X_s h_s = X_I h_I + n \quad (8)$$

The UE may extract the interferer DMRS using equation (8). That is, the UE may calculate $X_I$ by generating an interference DMRS sequence $C_{init}$ based on the slot number, scrambling ID, and virtual ID acquired at step 900 and estimate the interferer signal channel $h_I$ based on the interferer DMRS sequence. At this time, a channel estimation scheme such as a Least Square (LS) and a Minimum Mean Square Error (MMSE) may be used.

Accordingly, the UE may estimate an interferer's channel based on the combination of the virtual cell ID and scrambling ID of the interferer and acquire an additional transmission parameter of the interferer through blind detection with equation (4) at step 920.

Step 920 is described in more detail hereinafter. The UE may receive 6 virtual cell ID-scrambling ID combinations expressed as VCID1-0, VCID2-1, VCID3-0, VCID4-1, VCID5-0, and VCID6-1 at step 900. These combinations may be referred to as a candidate combination group for an interference channel. Here, VCID1-0 denotes the combination of the virtual cell ID 1 and the scrambling ID 0. Then the UE may generate a DMRS sequence for each virtual cell ID-scrambling ID combination and estimate the interferer's channel based thereon.

In the case of performing blind detection per an interferer's modulation order (QPSK, 16QAM, and 64QAM) based on the 6 virtual cell ID-scrambling ID combinations, the UE performs the blind detection operation, using equation (4), on the VCID1-0, VCID2-1, VCID3-0, VCID4-1, VCID5-0, and VCID6-1 per modulation order under the assumption of rank 1 and DMRS port 7. The UE also performs the blind detection operation on VCID1-0, VCID2-1, VCID3-0, VCID4-1, VCID5-0, and VCID6-1 per modulation order under the assumption of rank 1 and DMRS port 8. The UE also performs the blind detection operation on VCID1-0, VCID2-1, VCID3-0, VCID4-1, VCID5-0, and VCID6-1 per modulation order under the assumption of DMRS port 7-8. At this time, the UE may perform the blind detection operation under the assumption of an interference-free environment. The UE may check the virtual cell ID and scrambling ID for the interferer causing the most aggressive interference to the UE and the modulation order of the interferer based on the blind detection result.

Next, the UE removes interference using the interferers' transmission parameters including the blind detection result or calculates LLR using a conditional probability density function reflecting the statistical characteristics of the interferers' signals at step 940 and decodes the desired PDSCH at step 950.

If it is determined at step 910 that the transmission modes of the interferer do not include TM10, the UE may generate a DMRS sequence of the interferer using the physical cell ID as in equation (9). The DMRS sequence of the interferer is generated based on the physical cell ID as represented by equation (9). Next, the UE estimates the interferer's channel and acquires an additional transmission parameter of the interferer in a way similar to the method mentioned at step 920.

$$c_{init} = (\lfloor n_s/2 \rfloor + 1) \cdot (2N_{ID}^{cell} + 1) \cdot 2^{16} + n_{SCID} \quad (9)$$

Here, $N_{ID}^{cell}$ denotes the physical cell ID provided to the UE through higher layer signaling. See 3GPP standard TS36.211 for more detailed information on the DMRS sequence generation.

Embodiment 2

Embodiment 2 is directed to the blind detection operation of the UE configured in TM10 for detecting an additional transmission parameter of an interferer when the transmission mode of the interferer is TM10 or the candidate transmission mode set for the interferer's PDSCH includes TM10. Unlike embodiment 1 which is directed to the case where the transmission mode of the interferer is TM10, embodiment 2 is directed to the case where the transmission modes of the UE and the interferer are TM10. In this embodiment, it is assumed that the candidate transmission modes of the interferer operate based on DMRS. However, it will be understood by those skilled in the art that the present invention can be applied even to the CRS-based transmission modes with a slight modification without departing from the spirit and scope of the present invention.

The TM10 is a transmission mode configured for one UE to receive the desired signal (PDSCH) from one or more Transmission Points (TPs). At this time, the UE may receive a signal from a transmission point at a predetermined time point, and the transmission time point of PDSCH to the UE may vary over time. In this case, the eNB may notify the UE of the transmission point that transmits the PDSCH using a control channel. In order to perform the above operation efficiently, it is necessary to configure a virtual cell ID (or VCID) and a scrambling ID (or nSCID) to each transmission point, in addition to the physical cell ID (or PCID), for identification of the transmission point in the LTE/LTE-A system. That is, the UE configured in TM10 may be allocated the virtual cell ID and scrambling ID for two transmission points being used by the eNB for transmitting PDSCH. For example, the UE may be allocated the virtual cell ID and scrambling ID for the transmission points in the form of VCID3-0 and VCID2-1. Then the eNB may notify the UE of the transmission points for use in PDSCH transmission through a control channel, i.e. a bit indicating nSCID in the Downlink Control Information (DCI) format 2D. That is, if the nSCID is set to 0, the UE may configure the transmission point identified by VCID3.

Accordingly, if the interferer's transmission mode is TM10 or if the candidate transmission mode set of the interferer includes TM10, the UE may receive a plurality of virtual cell IDs and scrambling IDs concerning the interference from the eNB through higher layer signaling. A description is made hereinafter of the blind detection operation of the UE based on the plural virtual cell IDs and scrambling IDs received from the eNB.

For example, the UE configured in TM10 may receive VCID3-0 and VCID2-1 from the eNB, the VCID3-0 and VCID2-1 being configured to the UE for TM10 operation. The UE may further receive the virtual cell ID-scrambling ID combinations (such as VCID1-0, VCID4-1, VCID5-0, and VCID6-1) of interferers for interference control and suppression operations. Here, VCID1-0 denotes a combination of the virtual cell ID 1 and the scrambling ID 0. Then the eNB may configure transmission points to the UE through the control channel. Accordingly, the UE may perform the blind detection of additional parameters of the interferer with the interferer's DMRS information including the virtual cell IDs and scrambling IDs with the exception of the virtual cell ID-scrambling ID combinations configured through the control channel. The method according to embodiment 2 is capable of reducing the number of VCID-SCID combinations for use in blind detection.

The above operation is described hereinafter with reference to FIG. 10.

Figure 10:
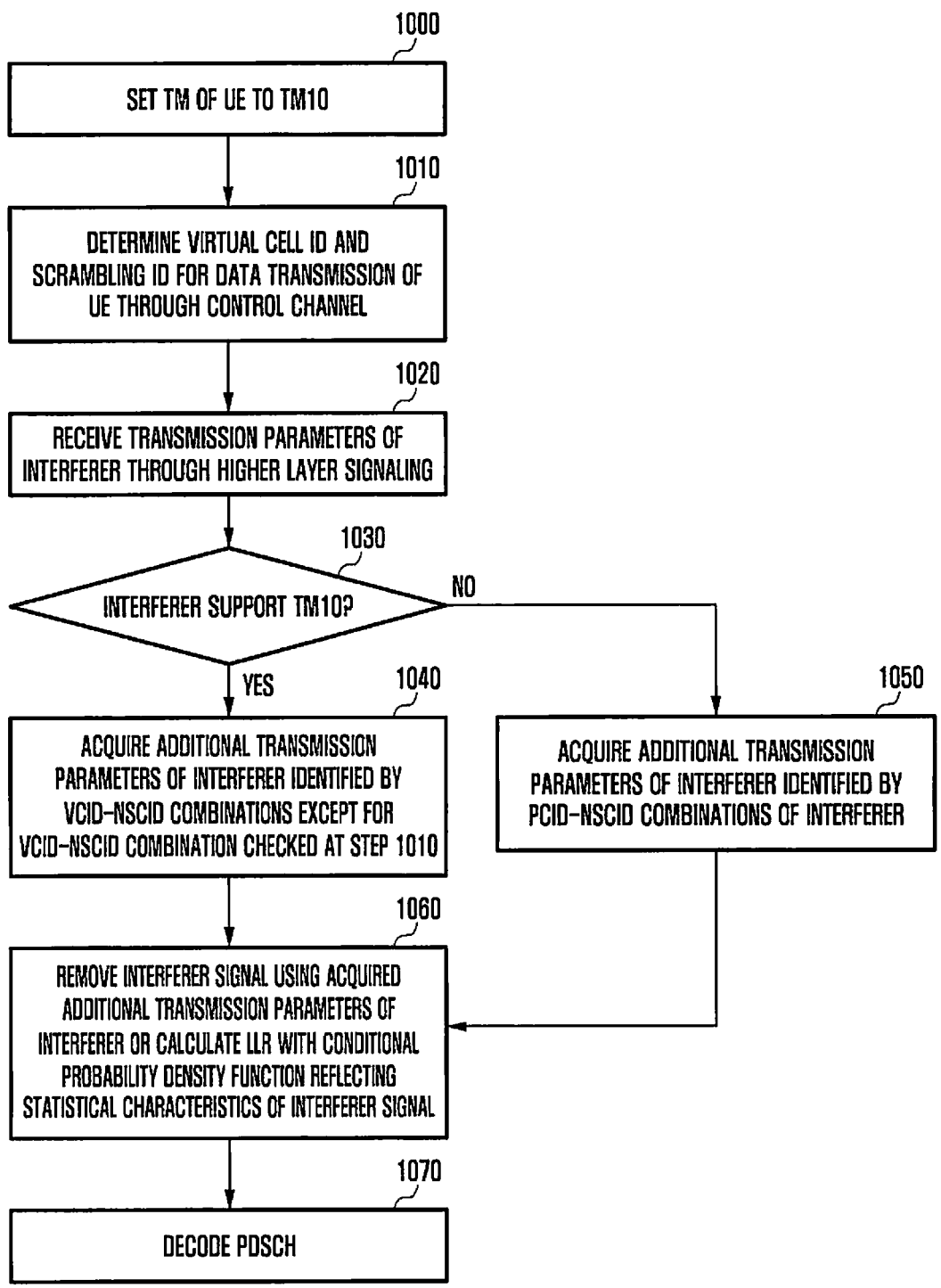
FIG. 10 is a flowchart illustrating a downlink data reception method of a terminal operating in TM10 according to embodiment 2.

FIG. 10 is a flowchart illustrating a downlink data reception method of a terminal operating in TM10 according to embodiment 2.

In reference to FIG. 10, the UE may be configured to operate in TM10 at step 1000. In this case, the UE may receive a virtual cell ID and a scrambling ID for use in operating in the TM10. The UE may determine the transmission point based on the virtual cell ID and scrambling ID configured through the control channel and receives PDSCH from the identified transmission point at step 1010. If the interferers' transmission parameters received at step 1020 from the eNB include TM 10, the procedure goes to step 1040 via step 1030 to perform an operation for detecting additional transmission parameters of the interferers based on the virtual cell ID and scrambling ID received at steps 1000 and 1020. At this time, the UE performs the blind detection operation with the virtual cell ID-scrambling ID combinations of the interferers with the exception of the combination of the virtual cell ID and scrambling ID received at step 1010. That is, the combination of the virtual cell ID and scrambling ID received at step 1010 relates to the cell transmitting the desired PDSCH to the UE and thus is excluded in the blind detection for acquiring additional parameters for use in interference cancellation. Refer to embodiment 1 for the detailed blind detection operation.

Step 1040 is described in more detail hereinafter. As described above, the UE configured in TM10 may receive the virtual cell ID-scrambling ID combinations such as VCID3-0 and VCID2-1 representing the transmission points at step 1000. The UE may further receive the virtual cell ID-scrambling ID combinations (such as VCID1-0, VCID4-1, VCID5-0, and VCID6-1) concerning interference at step 1020. Here, VCID1-0 denotes the combination of the virtual cell ID 1 and the scrambling ID 0. Then if the eNB configures the transmission point identified by VCID3-0 to the UE through the control channel at step 1010, the UE performs blind detection with VCID1-0, VCID4-1, VCID5-0, VCID6-1, and VCID2-1.

That is, if the UE receives 6 virtual cell ID-scrambling ID combinations and performs blind detection for the interferer's modulation order (QPSK, 16QAM, and 64QAM), it may perform the blind detection operation, using equation (4), on VCID1-0, VCID2-1, VCID3-0, VCID4-1, VCID5-0, and VCID6-1 (with the exception of the virtual cell ID-scrambling ID combination corresponding to the transmission point configured through the control channel) per modulation order under the assumption of rank 1 and DMRS port 7. The UE also performs the blind detection operation on VCID1-0, VCID2-1, VCID3-0, VCID4-1, VCID5-0, and VCID6-1 per modulation order under the assumption of rank 1 and DMRS port 8. The UE also performs the blind detection operation on VCID1-0, VCID2-1, VCID3-0, VCID4-1, VCID5-0, and VCID6-1 per modulation order under the assumption of DMRS port 7-8. At this time, the UE may perform the blind detection operation under the assumption of an interference-free environment. The UE may check the virtual cell ID and scrambling ID for the interferer causing the most aggressive interference to the UE and the modulation order of the interferer based on the blind detection result.

Next, the UE removes interference using the interferers' transmission parameters including the blind detection result or calculates LLR using a conditional probability density function reflecting the statistical characteristics of the interferers' signals at step 1060 and performs PDSCH decoding at step 1070.

If it is determined at step 1030 that the transmission modes of the interferer do not include TM10, the UE may generate a DMRS sequence of the interferer using the physical cell ID as in equation (9). Afterward, the interferer's channel may be estimated in the same manner. At this time, the UE may perform the blind detection operation per the virtual cell ID-scrambling ID combinations configured at step 1000 by the eNB. That is, the UE configured to operate in TM10 at step 1000 may receive the virtual cell ID-scrambling ID combinations such as VCID3-0 and VCID2-1 identifying the corresponding transmission points. Although the eNB configures the transmission point VCID3-0 to the UE through the control channel at step 1010, if the transmission modes of the interferers do not include TM10 at step 1030, the UE may perform the blind detection with VCID2-1 at step 1050.

Embodiment 3

Embodiment 3 is directed to a method for reducing blind detection attempts for acquiring additional transmission parameters of interferers. In detail, the UE determines presence/absence of an interferer's DMRS using the transmission parameters concerning the interferers and performs blind detection on the interference, i.e. interferer's DMRS, to acquire an additional transmission parameter of the interferer. In comparison with embodiment 1, embodiment 3 is characterized in that the blind detection is further performed on a group of candidate combinations with DMRS, thereby decreasing the blind detection load and processing complexity of the UE and managing the blind detection target list efficiently. In this embodiment, it is assumed that the candidate transmission modes of potential interferers operate based on DMRS. However, it will be understood by those skilled in the art that the present invention can be applied even to the CRS-based transmission modes with a slight modification without departing from the spirit and scope of the present invention.

A description is made of the method for determining whether DMRS interference is present. As described in embodiments 1 and 2, there is a need of parameters such as a physical cell ID or a virtual cell ID, a slot number, and a scrambling ID for generating a DMRS sequence. Accordingly, the UE may generate a DMRS sequence based on at least part of the above information received from the eNB or acquired through blind detection for use in controlling and suppressing interference. At this time, the UE may estimate the interferer's channel based on the generated DMRS sequence using a channel estimation method such as Least Square (LS) or Minimum Mean Square Error (MMSE) as described in embodiments 1 and 2. Refer to embodiment 1 for more details of the channel estimation method.

During the DMRS sequence-based channel estimation procedure, the UE may determine whether any interferer's DMRS is present. For example, whether any interferer's DMRS is present may be determined through power detection on the result of Coherent Combining (CC) of the channel values estimated under the assumption that the channel values at the REs correspond to the DMRS positions.

It may also be possible to consider a method for comparing a value acquired through MMSE channel estimation with a threshold value set to a logically acquired Mean Square Error (MSE) value. That is, the UE may determine whether any interference exists by comparing the power detection or MSE result obtained based on the channel estimation value at the DMRS resource positions with a threshold value. Here, the threshold value may be predefined or configured by the eNB.

The UE may perform blind detection with the virtual cell ID and scrambling ID of an interferer having a DMRS of which the presence is determined through the interferer DMRS presence/absence determination operation for acquiring an additional transmission parameter of the interferer.

The MMSE, MSE, and Power Detection methods described as examples of the interferer DMRS detection method have low complexities in comparison with the blind detection method requiring the process represented by equation (4). The method according to this embodiment is capable of reducing the UE complexity and the number of blind detection attempts in comparison to the blind detection method with all available virtual cell IDs and scrambling IDs as described in embodiments 1 and 2.

The above operation is described in detail hereinafter with reference to FIG. 11.

Figure 11:
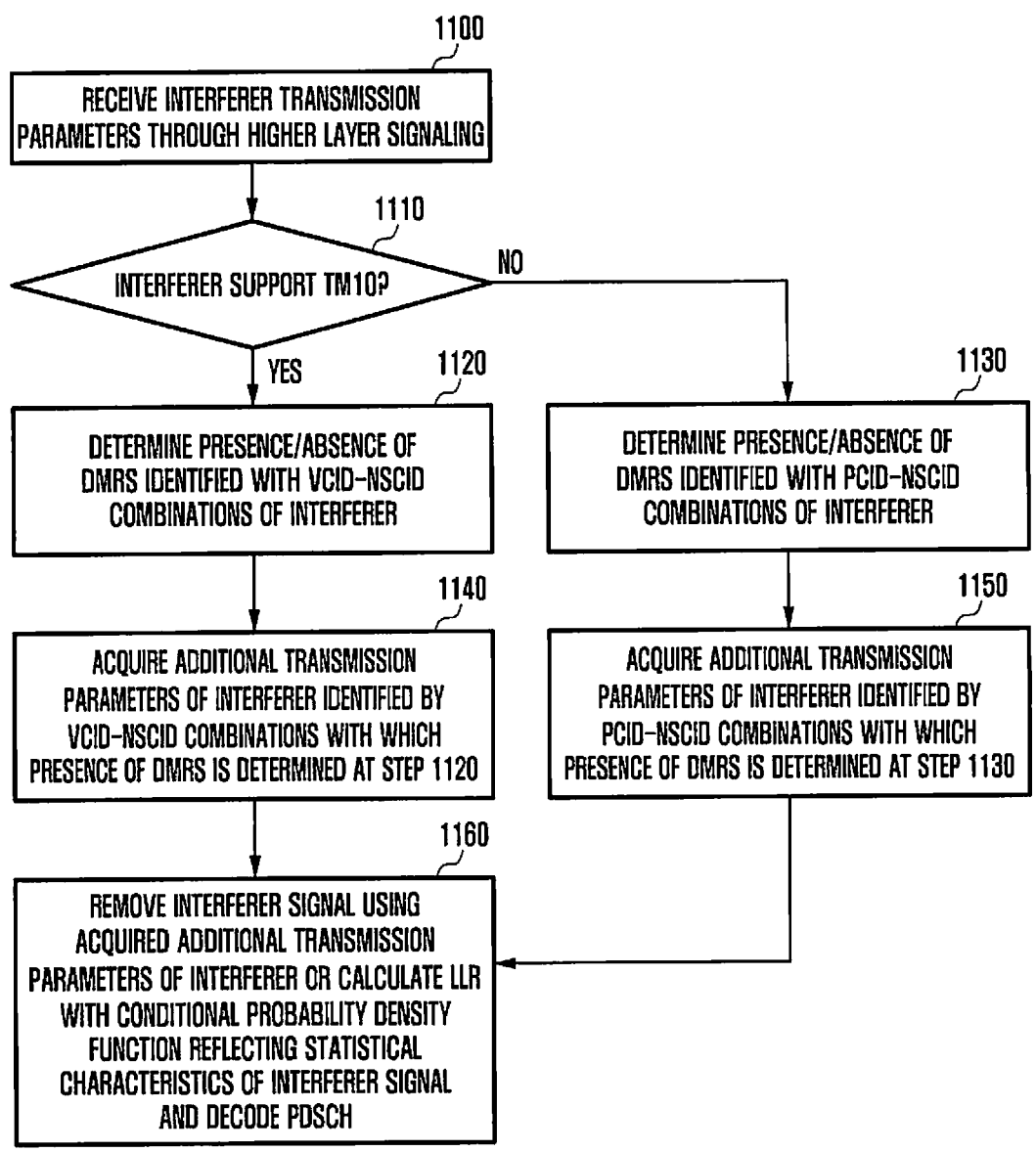
FIG. 11 is a flowchart illustrating a downlink data reception method of a UE according to embodiment 3.

FIG. 11 is a flowchart illustrating a downlink data reception method of a UE according to embodiment 3.

In reference to FIG. 11, at step 1100 the UE may receive an interferer's transmission parameters as shown in Table 1 from an eNB through higher layer signaling. In this embodiment, it is assumed that transmission modes of the interferers are comprised of DMRS-based transmission modes. Accordingly, the UE may receive the physical cell ID or the virtual cell ID and scramble ID of the interferer at step 1100.

If it is determined at step 1110 that the potential transmission modes of the interferer include TM10, the UE may determine whether any DMRS exists in association with the virtual cell IDs and scramble IDs of interferers that have been received at step 1100.

The above procedure is described in more detail hereinafter. The UE may receive 6 virtual cell ID-scrambling ID combinations expressed as VCID1-0, VCID2-1, VCID3-0, VCID4-1, VCID5-0, and VCID6-1 at step 1100. Here, VCID1-0 denotes the combination of the virtual cell ID 1 and the scrambling ID 0. Then the UE may generate a DMRS sequence for each virtual cell ID-scrambling ID combination for use in estimating the interferer channel and determining whether a DMRS is present per DMRS port in association with the DMRS sequence. At this time, whether any DMRS is present is determined using a threshold value predefined or configured by the eNB.

That is, in the case of performing blind detection per an interferer's modulation order (QPSK, 16QAM, and 64QAM) based on the 6 virtual cell ID-scrambling ID combinations, the UE determines the presence/absence of DMRS associated with VCID1-0, VCID2-1, VCID3-0, VCID4-1, VCID5-0, and VCID6-1 under the assumption of Rank 1 and DMRS port 7 at step 1120. Likewise, the UE determines the presence/absence of DMRS associated with VCID1-0, VCID2-1, VCID3-0, VCID4-1, VCID5-0, and VCID6-1 under the assumption of Rank 1 and DMRS port 8. The UE may also determine the presence/absence of DMRS associated with VCID1-0, VCID2-1, VCID3-0, VCID4-1, VCID5-0, and VCID6-1 under the assumption of Rank 2 and DMRS port 7-8. At this time, the UE may analogize the presence/absence of DMRS for the case of Rank 2 and DMRS port 7-8 out of the result from respective DMRS ports 7 and 8.

At this time, the UE may determine at step 1120 that the DMRSs associated with VCID1-0 and VCID4-1 exist for the DMRS port 7 and the DMRSs associated with VCID1-0 and VCID5-0 exist for DMRS port 8. Then the UE performs a blind decoding operation at step 1140 with the virtual cell ID and scrambling ID of the interferers that have DMRSs, as determined at step 1120, to acquire additional parameters of the interferers. That is, the UE performs the blind detection operation for QPSK, 16QAM, and 64QAM based on the VCID1-0 and VCID4-1 using equation (4) under the assumption of rank 1 and DMRS port 7. Then the UE may perform the blind detection operation for the case of rank 1 and DMRS port 8 and the case of rank 2 and DMRS port 7-8.

Next, the UE removes interference using the interferers' transmission parameters including the blind detection result or calculates LLR using a conditional probability density function reflecting the statistical characteristics of the interferers' signals to decode the desired PDSCH at step 1160.

If it is determined at step 1110 that the transmission modes of the interferer do not include TM10, the UE determines whether there are any DMRSs of interferers identified by the physical cell ID and scrambling ID at step 1130. Then the UE may perform detection at step 1150 for acquiring additional transmission parameters of the interferer with the physical ID and scrambling ID that are determined at step 1130 for the interferer having DMRS.

Embodiment 4

Embodiment 4 is directed to a method for reducing blind detection attempts for acquiring additional transmission parameters of an interferer at the UE configured in TM 10. In detail, the UE determines whether any interferer's DMRS exists using the transmission parameter of the interferer and performs blind detection for acquiring additional transmission parameters of the interferer. In comparison with embodiment 2, embodiment 4 is characterized in that the blind detection is further performed on a group of candidate combinations with DMRS, thereby decreasing blind detection load and processing complexity of the UE and managing the blind detection target list efficiently.

In this embodiment, it is assumed that the candidate transmission modes of potential interferers operate based at least on DMRS. However, it will be understood by those skilled in the art that the present invention can be applied even to the CRS-based transmission modes with a slight modification without departing from the spirit and scope of the present invention.

As described in the above embodiment, the UE may determine the presence/absence of an interferer DMRS during the DMRS sequence-based channel estimation procedure. For example, whether any interferer's DMRS is present may be determined through power detection on the result of Coherent Combining (CC) of the channel values estimated under the assumption that the channel values at the REs correspond to the DMRS positions.

It may also be possible to consider a method for comparing a value acquired through MMSE channel estimation with a threshold value set to a logically acquired Mean Square Error (MSE) value. That is, the UE may determine whether any interference exists by comparing the power detection or MSE result obtained based on the channel estimation value at the DMRS resource positions with a threshold value. Here, the threshold value may be predefined or configured by the eNB.

The UE may perform blind detection with the virtual cell ID and scrambling ID of an interferer having a DMRS of which the presence is determined through the interferer DMRS presence determination operation for acquiring an additional transmission parameter of the interferer. The MMSE, MSE, and Power Detection methods described as examples of the interferer DMRS detection method have less complexity in comparison with the blind detection method requiring the process represented by equation (4).

The method according to this embodiment is capable of reducing the UE complexity and the number of blind detection attempts in comparison with the blind detection method with all available virtual cell IDs and scrambling IDs as described in embodiments 1 and 2.

As described in embodiment 2, the TM10 is a transmission mode configured for one UE to receive the desired signal (PDSCH) from one or more Transmission Points (TPs). The TM10 supports Coordinated Multipoint (CoMP) transmission. The UE may receive a signal from one transmission point at a predetermined time point, and the transmission point transmitting PDSCH to the UE may vary over time. In this case, the eNB may notify the UE of the transmission point that transmits PDSCH using a control channel. In order to perform the above operation efficiently, it is necessary to configure a virtual cell ID (or VCID) and a scrambling ID (or nSCID) to each transmission point, in addition to the physical cell ID (or PCID), for identification of the transmission point in the LTE/LTE-A system. That is, the UE configured in TM10 may be allocated the virtual cell ID and scrambling ID for two transmission points being used by the eNB for transmitting PDSCH. For example, the UE may be allocated the virtual cell ID and scrambling ID for the transmission points in the form of VCID3-0 and VCID2-1. Then the eNB may notify the UE of the transmission points for use in PDSCH transmission through a control channel, i.e. a bit indicating nSCID in the Downlink Control Information (DCI) format 2D. That is, if the nSCID is set to 0, the UE may configure the transmission point identified by VCID3.

Accordingly, if the interferer's transmission mode is TM10 or if the candidate transmission mode set of the interferer includes TM10, the UE may receive a plurality of virtual cell IDs and scrambling IDs concerning the interference from the eNB through higher layer signaling. For example, the UE configured in TM10 may receive VCID3-0 and VCID2-1 from the eNB to operate in TM10. The UE may further receive the virtual ID-scrambling ID configurations of interferers that are expressed as VCID1-0, VCID2-1, VCID3-0, VCID4-1, VCID5-0, and VCID6-1 from the eNB for interference control and suppression operations. Here, VCID1-0 denotes a combination of the virtual cell ID 1 and the scrambling ID 0. That is, the UE determines the virtual cell ID-scrambling ID combinations expressed as VCID3-0, VCID2-1, VCID1-0, VCID4-1, VCID5-0, and VCID6-1.

Afterward, the eNB may configure transmission points to the UE using a control channel. Accordingly, the UE may perform the DMRS presence/absence determination and blind detection operation to acquire additional transmission parameters of the interferer using the DMRS information associated with the virtual cell ID-scrambling ID combinations with the exception of the virtual cell ID-scrambling ID combinations configured by the eNB through the control channel. That is, the UE configured in TM10 performs DMRS presence/absence determination and a blind detection operation to acquire additional parameters with the virtual cell ID-scrambling ID combinations excluding the virtual cell ID-scrambling ID combinations configured by the eNB.

The above operation is described hereinafter with reference to FIG. 12

Figure 12:
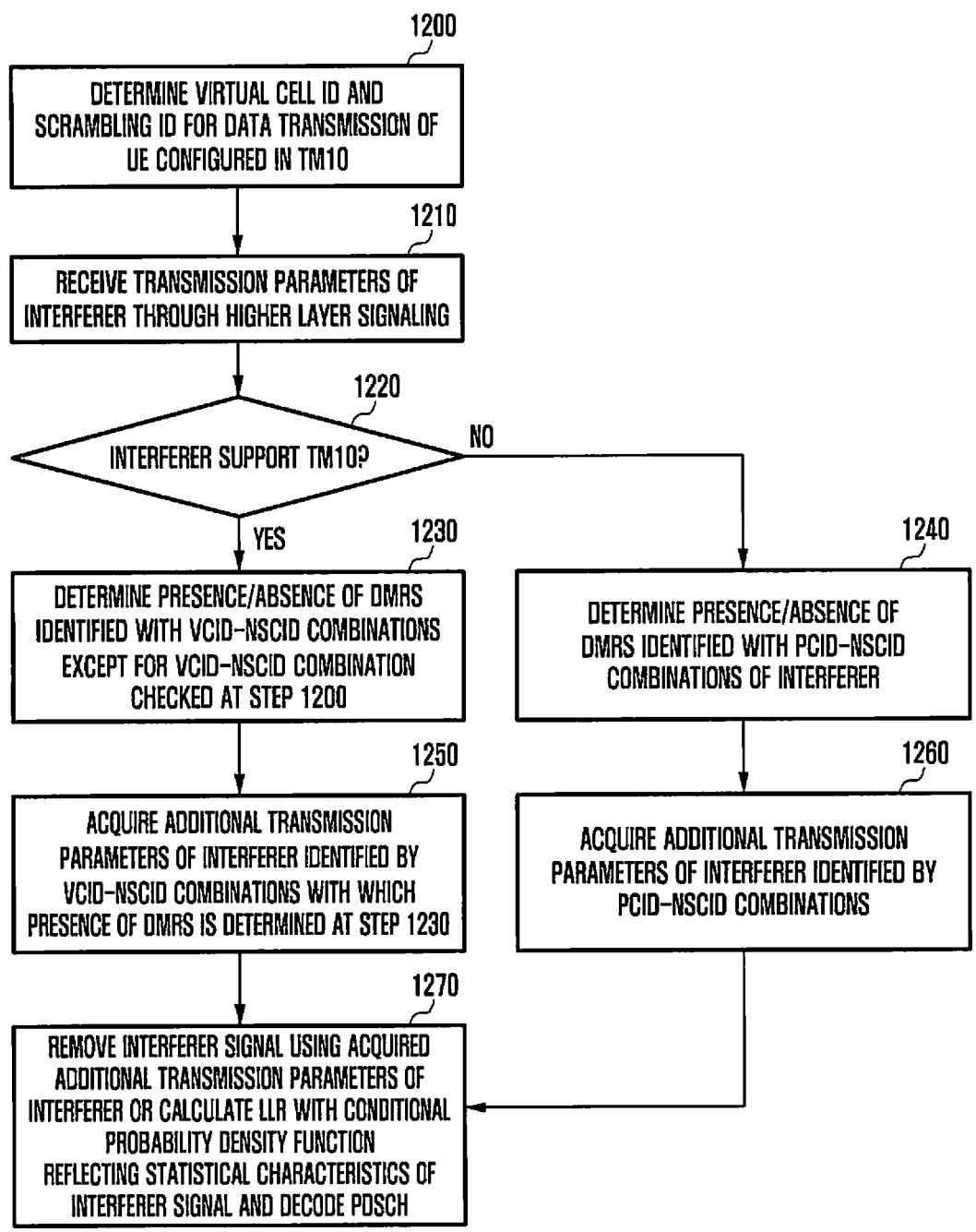
FIG. 12 is a flowchart illustrating a downlink data reception method of a UE configured in TM10 according to embodiment 4.

FIG. 12 is a flowchart illustrating a downlink data reception method of a UE configured in TM10 according to embodiment 4.

In reference to FIG. 12, the UE may be configured to operate in TM10 at step 1200. At this time, the UE may receive virtual cell ID-scrambling ID configurations to operate in the TM10. The UE may determine the transmission points represented by a serving virtual cell ID and scrambling ID configured to the UE using a control channel transmitted by the eNB. If it is determined at step 1220 that the interferer's transmission parameters received from the eNB at step 1210 include TM10, the UE may determine at step 1230 whether there is a DMRS corresponding to the virtual cell ID-scrambling ID combination received at steps 1200 and 1210. At this time, the UE may determine whether there is any DMRS identified with the virtual cell ID-scrambling ID combinations of the interferer with the exception of the serving virtual cell DI-scrambling ID combinations received at step 1200.

Step 1230 is described in more detail hereinafter. The UE that is configured in TM10 at step 1200 receives virtual cell ID-scrambling ID combinations such as VCID3-0 and VCID2-1 for identifying transmission points. If an interferer may operate in TM10, the UE may receive the virtual ID-scrambling ID combinations (such as VCID1-0, VCID4-1, VCID5-0, and VCID6-1) of the interferer additionally at step 1210. Here, VCID1-0 denotes a combination of the virtual cell ID 1 and the scrambling ID 0. If the eNB configures the transmission point of VCID3-0 to the UE through a control channel at step 1200, the UE determines whether there is any DMRS identified with one of the virtual cell ID-scrambling ID combinations of VCID1-0, VCID4-1, VCID5-0, VCID6-1, and VCID2-1 with the exception of the VCID3-0.

That is, in the case of performing blind detection per an interferer's modulation order (QPSK, 16QAM, and 64QAM) based on the 6 virtual cell ID-scrambling ID combinations, the UE performs the blind detection operation with the virtual cell ID-scrambling ID combinations with the exception of the virtual cell ID-scrambling ID combination of the transmission point configured by the eNB through the control channel (i.e., VCID3-0) per modulation order under the assumption of rank 1 and DMRS port 7 to determine presence/absence of DMRS identified with VCID1-0, VCID2-1, VCID4-1, VCID5-0, and/or VCID6-1. At this time, the UE may perform the blind detection with VCID1-0, VCID2-1, VCID4-1, VCID5-0, and VCID6-1 per modulation order under the assumption of rank 2 and DMRS port 8. The UE may also perform the blind detection with VCID1-0, VCID2-1, VCID4-1, VCID5-0, and VCID6-1 per modulation order under the assumption of rank 2 and DMRS port 7-8. At this time, the UE may check the presence/absence of DMRS identified with VCID1-0, VCID2-1, VCID4-1, VCID5-0, and/or VCID6-1 based on the results of the blind detection operations performed under the assumption of DMRS ports 7 and 8 with or without performing blind detection with the corresponding virtual cell ID-scrambling ID combinations under the assumption of rank 2 and DMRS port 7-8.

The UE may check the presence of the DMRS identified with VCID1-0 and VCID4-1 for the DMRS port 7 at step 1230 and the DMRS identified with VCID1-0 and VCID5-0 for the DMRS port 8. Afterward, the UE may perform the blind detection operation at step 1250 to acquire additional parameters of the interferer in association with the respective DMRS ports based on the virtual cell ID and scrambling ID with which the presence of the DMRS has been checked at step 1240. That is, the UE may perform the blind detection operation with VCID1-0 and VCID4-1 per each of QPSK, 16QAM, and 64QAM as shown in equation (4) under the assumption of rank 1 and DMRS port 7.

Next, the UE removes interference using the interferers' transmission parameters including the blind detection result or calculates LLR using a conditional probability density function reflecting the statistical characteristics of the interferers' signals to decode the desired PDSCH at step 1270.

If it is determined at step 1220 that the transmission modes of the interferer do not include TM10, the UE may generate a DMRS sequence of the interferer using the physical cell ID as in equation (9). Afterward, the UE may perform the DMRS presence/absence determination operation at step 1240 by the same method as above. Next, the UE performs the blind decoding operation at step 1260 to acquire additional transmission parameters of the interferers identified by the physical ID-scrambling ID combinations with which the presence of DMRS has been checked at step 1240.

At this time, the UE may determine presence/absence of DMRS identified with the virtual cell ID-scrambling ID combinations configured by the eNB at step 1200 as well as the physical cell ID-scrambling ID combinations. That is, the UE configured in TM10 may receive the virtual cell ID-scrambling ID combinations such as VCID3-0 and VCID2-1 of the transmission points. If the eNB configures VCID3-0 to the UE and it is determined at step 1220 that the transmission modes of the interferers do not include TM10, the UE may check the presence/absence of DMRS identified with VCID2-1 at step 1240. If it is determined that no corresponding DMRS exists, the UE performs blind detection to acquire additional parameters of the interferer at step 1260. That is, the UE may perform the DMRS presence/absence determination at step 1240 and the blind detection operation with the virtual cell ID-scrambling ID combinations configured for TM10 operation without exception of the virtual cell ID-scrambling ID combination configured by the eNB through the control channel.

Here, the UE may perform the DMRS presence/absence determination and blind detection operation only with the virtual cell ID-scrambling ID combinations configured for the TM10 operation with the exception of the virtual cell ID-scrambling ID combination configured by the eNB through the control channel and may further perform the DMRS presence/absence determination and blind detection operation with the physical cell ID-scrambling ID combination as well as the virtual cell ID-scrambling ID combinations.

Embodiment 5

Embodiment 5 is directed to a method for performing blind detection by checking the presence/absence of DMRS based on the transmission parameters of interferers, as in the embodiments 3 and 4, and then acquiring additional transmission parameters of part of the interferers causing DMRS interference. This method is capable of reducing the UE complexity and the number of blind detection attempts.

The present embodiment is described under the assumption that the candidate transmission modes of potential interferers operate based at least on DMRS. However, it will be understood by those skilled in the art that the present invention can be applied even to the CRS-based transmission modes with a slight modification without departing form the spirit and scope of the present invention.

As described in embodiments 3 and 4, the UE may check the presence/absence of interferer DMRS with a method such as Minimum Mean Square Error (MMSE), Mean Square Error (MSE), and Power Detection during the DMRS sequence-based channel estimation procedure. At this time, the UE may perform blind detection to acquire additional transmission parameters of the interferer identified by the virtual cell ID and scrambling ID with the presence of DMRS as determined through the interferer DMRS presence/absence determination operation.

Here, the UE may perform the blind detection to acquire additional transmission parameters of the interferers identified by the virtual cell IDs and scrambling IDs of part of the interferer having DMRS based on the DMRS presence/absence determination information. A method of selecting the virtual cell ID-scrambling ID combinations of part of the interferers is described hereinafter.

[Method 5-1]: Selecting K Virtual Cell ID-Scrambling ID Combinations for a Blind Detection Operation Based on User Information Used in Checking DMRS Presence/Absence A description is made of the case where interferer DMRS presence/absence is determined through power detection. Although the description is made of the case of using power detection information, all kinds of information available for determining presence/absence of DMRS such as MSE value can be used.

It is assumed that the operation of determining presence/absence of interferer DMRS is performed using the power detection method. At this time, the UE may check the presence of DMRS of the interferers identified by VCID1-0, VCID4-1, and VCID5-0 for DMRS port 7 through the detection operation. At this time, the UE may not perform blind detection, for acquiring additional transmission parameters, with the virtual cell ID and scrambling ID with which the power level measured as a result of the power detection operation is less than a predetermined threshold value or a threshold value configured by the eNB.

That is, if the power level of the interferer identified by VCID5-0, among VCID1-0, VCID4-1, and VCID5-0 that were checked for the presence of DMRS, is less than the threshold value, the UE may perform the blind detection operation for acquiring additional transmission parameters of the interferer PDSCH only with VCID1-0 and VCID4-1. By performing the blind detection operation only with the virtual cell ID-scrambling ID combinations with which the DMRS power level is greater than the predetermined threshold value, it is possible to reduce the UE complexity.

[Method 5-2]: Performing a Blind Detection Operation Sequentially Based on DMRS Presence/Absence Determination Information A description is made of the case where interferer DMRS presence/absence is determined through power detection. Although the description is made of the case of using power detection information, all kinds of information available for determining presence/absence of DMRS such as MSE value can be used.

It is assumed that the operation of determining presence/absence of interferer DMRS is performed using the power detection method. At this time, the UE may determine the presence of DMRS of the interferers identified by VCID1-0, VCID2-1, VCID3-0, and VCID4-1 for DMRS port 7 through the detection operation. The UE may arrange the virtual cell ID-scrambling ID combinations that are checked for the presence of DMRS in an order of power strength measured through the power detection operation. For example, the virtual cell ID-scrambling ID combinations may be arranged in the order of VCID2-1, VCID1-0, VCID4-1, and VCID3-0. Then the UE may perform the blind detection operation to acquire additional transmission parameters of the interferer PDSCH identified with the corresponding virtual cell IDs and scrambling IDs in the order arranged as above.

At this time, the UE may perform the blind detection operation with K virtual cell ID-scrambling ID combinations preconfigured or configured by the eNB through higher layer signaling. At this time, K may be set to one of values including 1. That is, if the eNB configures the UE to perform blind detection with up to 2 virtual cell ID-scrambling ID combinations, the UE may perform blind detection on the interferer identified by the VCID2-1 and VCID1-0 among the virtual cell ID-scrambling ID combinations arranged in the order of VCID2-1, VCID1-0, VCID4-1, and VCID3-0 to acquire additional parameters of the interferer.

It may also be possible to apply methods 5-1 and 5-2 simultaneously. That is the UE may perform the blind detection only with K virtual cell ID-scrambling ID combinations among the virtual cell ID-scrambling ID combinations greater in number than a predetermined threshold value in determining the presence/absence of DMRS.

[Method 5-3]: Performing with Priority Blind Detection with Virtual Cell IDs and Scrambling Cell IDs Configured for TM10 Operation As described above, the UE configured in TM10 may receive virtual cell IDs and scrambling IDs for TM10 operation. For example, the virtual cell IDs and scrambling IDs may be received in the form of combinations such as VCID3-0 and VCID2-1 from the transmission point available for the UE. Then the UE receives the information on the transmission point that transmits PDSCH from the eNB. At this time, the UE may perform with priority the interferer DMRS presence/absence determination operation or blind detection operation for the remaining transmission points that are not configured through the control channel.

This embodiment includes performing the blind detection operation with the virtual cell IDs and scrambling IDs in the order as arranged in determining the presence of interferer DMRS as well as determining the presence of interferer DMRS and performing the blind detection operation with all of the virtual cell ID-scrambling ID combinations satisfying the above conditions. That is, the UE performs the blind detection operation with the first virtual cell ID-scrambling ID combination among the virtual cell ID-scrambling ID combinations arranged in determining the presence of interferer DMRS and, if it is determined that the blind detection result is equal to or greater than a predetermined threshold value, stops performing the blind detection, and removes interference using the interferers' transmission parameters including the blind detection result or calculates LLR using a conditional probability density function reflecting the statistical characteristics of the interferers' signals to decode the desired PDSCH.

Embodiment 6

Embodiment 6 is directed to a method for a UE to determine the presence/absence of interferer DMRS identified with part of the virtual cell ID-scrambling ID combinations using the transmission parameters of interferers. This method is capable of reducing the number of interferer DMRS presence/absence determination and blind detection attempts of the UE.

In this embodiment, it is assumed that the candidate transmission modes of potential interferers operate based at least on DMRS. However, it will be understood by those skilled in the art that the present invention can be applied even to CRS-based transmission modes with a slight modification without departing form the spirit and scope of the present invention.

The above operation is described hereinafter with reference to FIG. 13.

Figure 13:
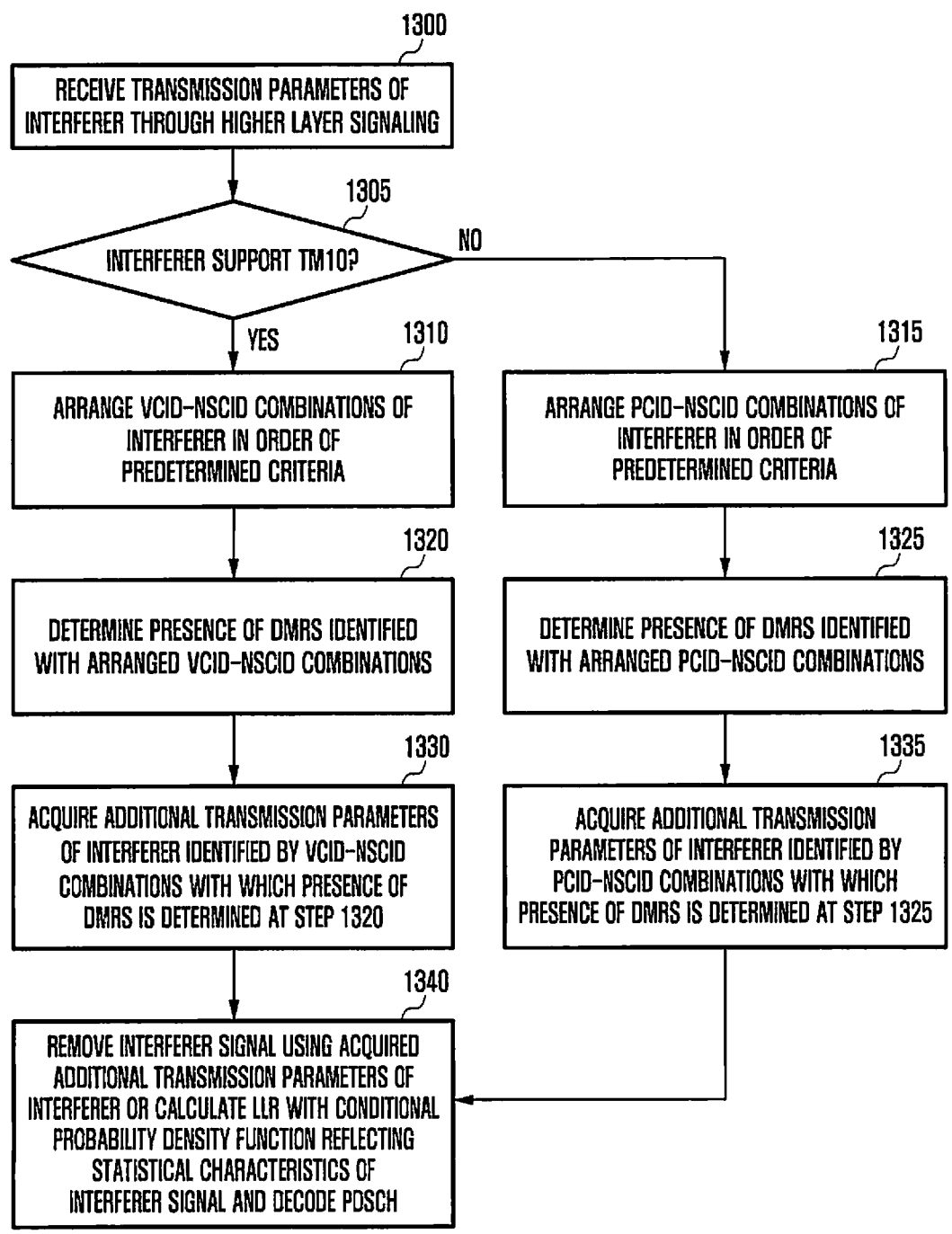
FIG. 13 is a flowchart illustrating a downlink data reception method of a UE according to embodiment 6.

FIG. 13 is a flowchart illustrating a downlink data reception method of a UE according to embodiment 6.

In reference to FIG. 13, the UE may receive part of interferer's transmission parameters including transmission modes for interferer PDSCH or available candidate transmission modes from the eNB at step 1300. If it is determined at step 1305 that the transmission modes for the interferer PDSCH include TM10, the UE may receive the virtual cell ID-scrambling ID combinations (e.g., VCID1-0, VCID2-1, VCID3-0, VCID4-1, VCID5-0, and VCID6-1) of the corresponding interferers at step 1300. Here, VCID1-0 denotes the combination of the virtual cell ID 1 and the scrambling ID 0.

If the UE receives the Quasi-co-location (QCL) information between CRS and CSI-RS of the interferer from the eNB at step 1300, the UE may measure an interferer channel based on the CSI-RS. The UE may arrange the interferers' virtual cell ID-scrambling ID combinations in an order of channel strength at step 1310, the channel strengths being measured based on the interferers' channel strength information. At step 1320, the UE may determine the presence/absence of interferer DMRS identified with the interferer virtual cell ID-scrambling ID combinations arranged at step 1310 in an order of measured channel strength.

It may be assumed that the virtual cell ID-scrambling ID combinations of the interferers are arranged in a descending order of channel strength, (e.g., VCID3-0, VCID4-1, VCID1-0, VCID2-1, VCID5-0, and VCID6-1). At this time, the UE may determine the presence/absence of DMRS of an interferer identified by VCID3-0 for each DMRS port (DMRS port 7, DMRS port 8, and DMRS port 7-8). If it is determined that the DMRS of the interferer identified by VCID3-0 is absent, the UE determines the presence/absence of the DMRS of the interferer identified by the next virtual cell ID-scrambling ID combination, i.e., VCID4-1. If it is determined that the DMRS of the interferer identified by VCID4-1 is present, the UE performs the blind detection operation to acquire additional transmission parameters of the interferer at step 1330. By performing the interferer DMRS detection and blind detection operation sequentially as above, it is possible to reduce the interference control operation complexity of the UE.

Using method 1 and method 2 of embodiment 5, it is possible to further reduce the number of DMRS presence/absence determination and blind detection attempts.

Next, the UE removes interference using the interferers' transmission parameters including the blind detection result or calculates LLR using a conditional probability density function reflecting the statistical characteristics of the interferers' signals to decode the desired PDSCH at step 1340.

If it is determined at step 1305 that the transmission modes of the interferer do not include TM10, the UE may generate a DMRS sequence of the interferer using the physical cell ID as in equation (9). Then the UE may determine the presence/absence of DMRS by the same method as above. At this time, the UE may arrange the interferer physical cell ID-scrambling ID combinations in an order of channel strength based on the interferer channel strength information as at step 1310. The UE may determine at step 1325 the presence/absence of interferer DMRS identified with the arranged physical cell ID-scrambling ID combinations. Next, the UE may perform the blind detection operation, at step 1335, with the physical cell ID-scrambling ID combination with which the presence of interferer DMRS is determined.

Using method 1 and method 2 of embodiment 5, it is possible to reduce the number of DMRS presence/absence determination and blind detection attempts.

Embodiment 7

Embodiment 7 is directed to a method for a UE configured in TM10 to determine the presence/absence of DMRS associated with part of the virtual cell ID-scrambling ID combinations using the transmission parameters of interferers as in embodiments 4 and 5. This method is capable of reducing the number of interferer DMRS presence/absence determination and blind detection attempts of the UE.

The present embodiment is described under the assumption that the candidate transmission modes of potential interferers operate based at least on DMRS. However, it will be understood by those skilled in the art that the present invention can be applied even to the CRS-based transmission modes with a slight modification without departing form the spirit and scope of the present invention.

The operation of the UE configured in TM10 is described hereinafter with reference to FIG. 14.

Figure 14:
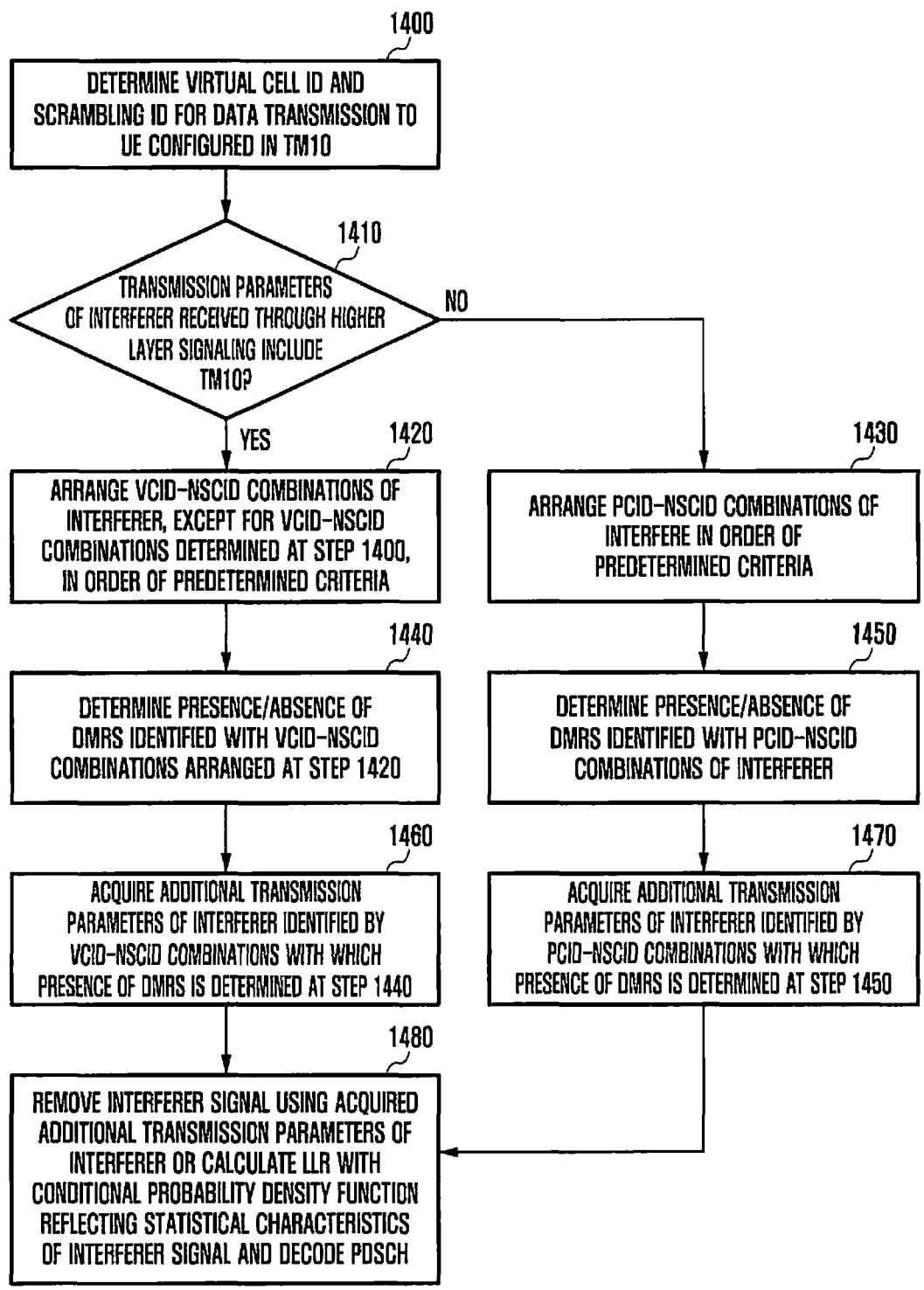
FIG. 14 is a flowchart illustrating a downlink data reception method of a UE configured in TM10 according to embodiment 7.

FIG. 14 is a flowchart illustrating a downlink data reception method of a UE configured in TM10 according to embodiment 7.

In reference to FIG. 14, the UE may be configured in TM10 at step 1400. At this time, the UE may receive the virtual cell ID-scrambling cell ID combinations such as VCID3-0 and VCID2-1 to operate in TM10. The UE may determine the transmission points identified by the virtual cell ID-scrambling ID configured through the control channel (e.g., DCI formation 2D transmitted through PDCCH) and receive PDSCH from the transmission points.

The UE may receive part of the interferer's transmission parameters including the interferer PDSCH transmission mode or available candidate transmission modes from the eNB at step 1410. If it is determined that the interferer PDSCH transmission modes include TM10, the UE may receive virtual cell IDs and scrambling IDs (e.g., VCID1-0, VCID4-1, VCID5-0, and VCID6-1) of the corresponding interferer from the eNB. Here, VCID1-0 denotes the combination of the virtual cell ID 1 and the scrambling ID 0. If the UE receives the Quasi-co-location (QCL) information between CRS and CSI-RS of the interferer from the eNB at step 1410, the UE may measure an interferer channel based on the CSI-RS. The UE may arrange the interferers' virtual cell ID-scrambling ID combinations in an order of channel strength at step 1420, the channel strengths being measured based on the interferers' channel strength information at step 1420.

[Method 7-1] Arranging Virtual Cell ID-Scrambling ID Combinations in an Order of Measured Interferer Channel Strength

[Method 7-2] Arranging virtual cell ID-scrambling ID combinations through method 7-1 and rearranging virtual cell ID-scrambling ID combinations received for TM10 operation of a UE at the beginning. That is, the virtual cell ID-scrambling ID combinations that are not the UE's serving virtual cell ID-scrambling ID combinations, among the virtual cell ID-scrambling ID combinations received for TM10 operation of the UE, are likely to be those of interferers. Accordingly, among the virtual cell ID-scrambling ID combinations received for TM10 operation of the UE, the virtual cell ID-scrambling ID combinations that are not the UE's serving virtual cell ID-scrambling ID combinations may be arranged to have the highest priority for blind detection.

The UE may perform the interferer DMRS presence/absence determination sequentially, at step 1440, on the interferer virtual cell ID-scrambling ID combinations arranged in an order of channel strength, the channel strengths being measured at step 1420 or an earlier step. It may be assumed that the virtual cell ID-scrambling ID combinations are arranged in a descending order of measured channel strength, e.g., VCID3-0, VCID4-1, VCID1-0, VCID2-1, VCID5-0, and VCID6-1. At this time, the UE may exclude the UE's serving virtual cell ID-scrambling ID combinations from the arranged virtual cell ID-scrambling ID combinations. That is, if the eNB sets the scrambling ID bit of the DCI format 2D to 0, i.e., if the eNB notifies the UE of VCID3-0 as the UE's serving virtual cell- and scrambling ID combination, the UE may perform interferer DMRS presence/absence determination with VCID4-1, VCID1-0, VCID2-1, VCID5-0, and VCID6-1 sequentially, except for VCID3-0. If the eNB sets the scrambling ID bit of the DCI format 2D to 1, the UE may exclude VCID2-1 from the arranged virtual cell ID-scrambling ID combinations.

If it is determined that the DMRS of the interferer identified by VCID4-1 is absent in association with the respective DMRS ports (DMRS port 7, DMRS port 8, and DMRS port 7-8), the UE may determine whether the DMRS of the interferer identified by the next virtual cell ID-scrambling ID combination, i.e. VCID1-0, is present. If it is determined that the DMRS of the interferer identified by VCID1-0 is present, the UE may perform the blind detection operation to acquire an interferer's additional transmission parameters associated with the virtual cell ID-scrambling ID combination (VCID1-0) at step 1460. By performing the interferer DMRS presence/absence determination and blind detection operation sequentially as described above, it is possible to reduce the interference control operation complexity of the UE. Refer to the previous embodiments for a detailed blind detection operation.

At this time, using methods 1 and 2 of embodiment 5, it is possible to reduce the number of interferer DMRS presence/absence determination and blind detection attempts.

Next, the UE removes interference using the interferers' transmission parameters including the blind detection result or calculates LLR using a conditional probability density function reflecting the statistical characteristics of the interferers' signals to decode the desired PDSCH at step 1480.

If it is determined at step 1410 that the transmission modes of the interferer do not include TM10, the UE may generate a DMRS sequence of the interferer using the physical cell ID as in equation (9). Then the UE may determine the presence/absence of DMRS by the same method as above. At this time, the UE may arrange the interferer physical cell ID-scrambling ID combinations in an order of channel strength based on the interferer channel strength information as at step 1430. The UE may determine the presence/absence of interferer DMRS identified with the arranged physical cell ID-scrambling ID combinations at step 1450. Next, the UE may perform the blind detection operation, at step 1470, with the physical cell ID-scrambling ID combination with which the presence of interferer DMRS is determined At this time, using methods 1, 2, and 3 of embodiment 5, it is possible to reduce the number of DMRS presence/absence determination and blind detection attempts.

Figure 15:
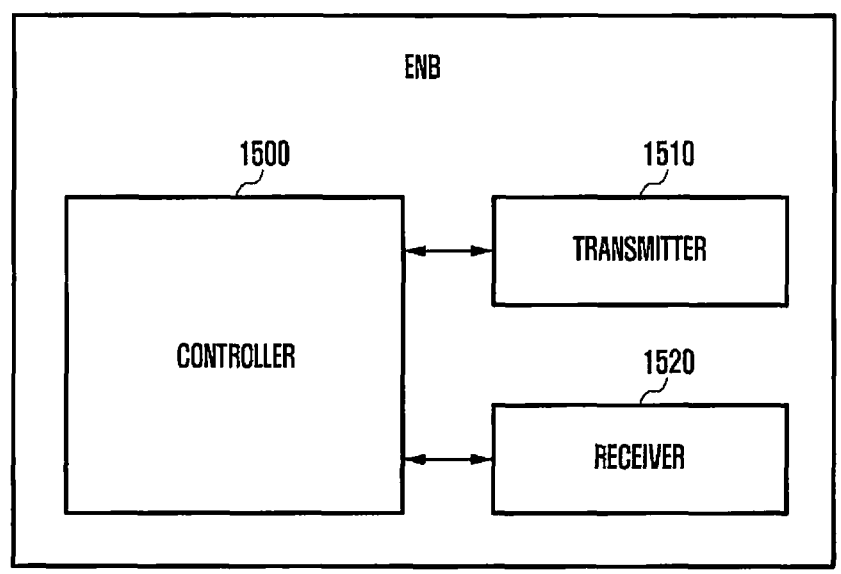
FIG. 15 is a block diagram illustrating an eNB configured to support UE receiver performance enhancement through an interference cancellation and suppression method according to an embodiment of the present invention.

FIG. 15 is a block diagram illustrating an eNB configured to support UE receiver performance enhancement through an interference cancellation and suppression method according to an embodiment of the present invention.

As shown in FIG. 15, the eNB may include a controller 1500, a transmitter 1510, and a receiver 1520.

The controller 1500 may determine part or all of UE-specific interferer cell configuration and interferer cell transmission parameters to be transmitted to the UE; PDSCH scheduling and corresponding CSI-RS and CRS information; and downlink bandwidth (or total number of RBs), subframe carrying PRS, and MBSFN information.

The interferer cell transmission parameters determined by the controller 1500 may be sent to the UE by means of the transmitter 1510. According to the PDSCH scheduling determination of the controller 1500, the transmitter 1510 may transmit control information and PDSCH to the UE. The controller 1500 may also control the receiver 1520 to receive channel state information for PDSCH transmission and PDSCH scheduling for the UE.

Although the eNB is illustrated as having separated function blocks for convenience of explanation, the configuration of the eNB is not limited thereby. For example, the eNB may include a communication unit comprised of the transmitter 1510 and the receiver 1520. The eNB may communicate with at least one network node by means of the communication unit.

The controller 1500 may control the eNB to perform the eNB operations described with reference to FIGS. 1 to 14.

Figure 16:
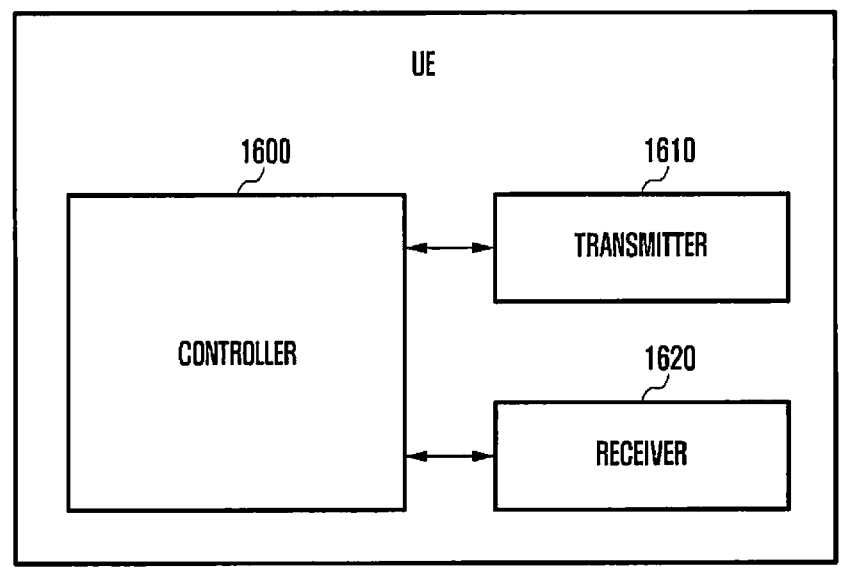
FIG. 16 is a block diagram illustrating a UE configured to perform an interference cancellation and suppression method according to an embodiment of the present invention.

FIG. 16 is a block diagram illustrating a UE configured to perform an interference cancellation and suppression method according to an embodiment of the present invention.

As shown in FIG. 16, the UE may include a controller 1600, a transmitter 1610 and a receiver 1620.

In FIG. 16, the controller 1600 may receive control information of serving and interferer cell transmission parameter configurations and check the control channel region of the interferer cell. The controller 1600 may measure interferer channels with certain radio resources and determine whether to perform blind detection and a set of RI and PMI information for use in blind detection. The controller 1600 may also perform the blind detection and decoding for canceling and suppressing interference. The controller 1600 may also check PDSCH scheduling information from the control information received by the receiver 1620. The controller 1600 may include a decoder for decoding the PDSCH received by means of the receiver 1620.

According to an embodiment of the present invention, the controller 1600 may control to receive transmission parameters of at least one interferer channel; determine whether the transmission modes (TM) of the interferer channel or a specific TM of available transmission modes is supported; perform, if the TM is supported, blind detection with candidate combinations of virtual cell IDs (VCIDs) and scramble IDs (SCIDs) of the interferer channel; and cancel interference to the UE based on the blind detection result. At this time, the specific transmission mode may be the transmission mode 10 (TM10). The blind detection result may include information on the modulation order of the interferer cell that causes the most aggressive interference to the UE.

The controller 1600 may also determine whether the transmission mode of the UE is the specific transmission mode and controls, when the transmission mode of the UE is the specific transmission mode, to check VCID and SCID for use in data transmission of the UE through the control channel of the UE and to perform blind detection with the candidate combinations except for the VCID and SCID used in data transmission to the UE among the candidate VCID-SCID combinations.

The controller 1600 may also determine whether any DMRS is present in association with each of the candidate VCID-SCID combinations and, if it is determined that any DMRS is present, controls to perform blind detection only with the VCID-SCID combinations with which the presence of DMRS is detected.

The controller 1600 may also control to perform the blind detection with a predetermined number of VCID-SCID combinations among the VCID-SCID combinations with which the presence of DMRS is detected. The controller 1600 may also arrange the VCID-SCID combinations in an order of interferer channel strength and controls to perform the blind detection in the order of arrangement.

The controller 1600 may also assign priorities to the VCID-SCID combinations received for a specific TM operation in performing the blind detection operation.

The control unit 1600 may also control to perform, when the specific TM is not supported for the interferer channel, blind detection with combinations of physical cell IDs (PCIDs) and SCIDs.

Although the UE is illustrated as having separated function blocks for convenience of explanation, the configuration of the UE is not limited thereby. For example, the UE may include a communication unit comprised of the transmitter 110 and the receiver 1620. The UE may communicate with at least one network node by means of the communication unit.

The controller 1600 may control the UE to perform the UE operations described with reference to FIGS. 1 to 14.

The invention claimed is:

1. An interference cancellation method of a terminal in a mobile communication system, the method comprising:
   receiving first transmission parameters of an interference channel;
   determining whether the interference channel supports a predetermined transmission mode (TM) based on the first transmission parameters;
   estimating, when the interference channel supports the predetermined TM, a channel state of the interference channel using a demodulation reference signal (DMRS) determined based on a blind detection with a group of virtual cell identifier-scrambling identifier (VCID-SCID) combinations of the interference channel;
   obtaining a second transmission parameter of the interference channel based on the channel state, wherein the second transmission parameter includes at least one of a modulation order, a rank indicator, or a precoding matrix index of an interference cell causing the most aggressive interference to the terminal; and canceling interference to the terminal based on the second transmission parameter of the interference channel.

2. The method of claim 1, wherein the predetermined transmission mode is a transmission mode 10 (TM10).

3. The method of claim 1, further comprising:

determining whether the transmission mode of the terminal is the predetermined transmission mode; and identifying, when the transmission mode of the terminal is the predetermined transmission mode, the VCID and SCID for data transmission to the terminal through a control channel, wherein the blind detection is performed with the group from which the VCID-SCID combination used in the data transmission to the terminal is excluded.

4. The method of claim 1, further comprising:

determining whether the DMRS is included in the group; and performing the blind detection only with the VCID-SCID combinations with which the DMRS is detected.

5. The method of claim 4, wherein the blind detection is performed with a predetermined number of VCID-SCID combinations among the VCID-SCID combinations with which the DMRS is detected.

6. The method of claim 1, further comprising:

arranging the VCID-SCID combinations based on interference channel strength information of respective VCID-SCID combinations included in the group; and performing the blind detection in an order of arrangement.

7. The method of claim 2, wherein the blind detection is performed by assigning priorities to the VCID-SCID combinations.

8. The method of claim 1, further comprising performing, when the interference channel does not support the predetermined TM, the blind detection with a group of physical cell identifier-scrambling identifier (PCID-SCID) combinations of the interference channel.

9. A terminal in a mobile communication system, the terminal comprising:

a transceiver configured to transmit and receive a signal; and a controller configured to:

receive first transmission parameters of an interference channel, determine whether the interference channel supports a predetermined transmission mode (TM) based on the first transmission parameters, estimate, when the interference channel supports the predetermined TM, a channel state of the interference channel using a demodulation signal (DMRS) determined based on a blind detection with a group of virtual cell identifier-scrambling identifier (VCID-SCID) combinations of the interference channel, obtain a second transmission parameter of the interference channel based on the channel state, wherein the second transmission parameter includes at least one of a modulation order, a rank indicator, or a precoding matrix index of an interference cell causing the most aggressive interference to the terminal, and cancel interference to the terminal based on the second transmission parameter of the interference channel.

10. The terminal of claim 9, wherein the predetermined transmission mode is a transmission mode 10 (TM10).

11. The terminal of claim 9, wherein the controller is further configured to:

determine whether the transmission mode of the terminal is the predetermined transmission mode, and identify, when the transmission mode of the terminal is the predetermined transmission mode, the VCID and SCID for data transmission to the terminal through a control channel, wherein the blind detection is performed with the group from which the VCID-SCID combination used in the data transmission to the terminal is excluded.

12. The terminal of claim 9, wherein the controller is further configured to:

determine whether the DMRS is included in the group, and perform the blind detection only with the VCID-SCID combinations with which the DMRS is detected.

13. The terminal of claim 12, wherein the blind detection is performed with a predetermined number of VCID-SCID combinations among the VCID-SCID combinations with which the DMRS is detected.

14. The terminal of claim 9, wherein the controller is further configured to:

arrange the VCID-SCID combinations based on interference channel strength information of respective VCID-SCID combinations included in the group, and perform the blind detection in an order of arrangement.

15. The terminal of claim 10, wherein the controller is further configured to assign priorities to the VCID-SCID combinations with which the blind detection is performed.

16. The terminal of claim 9, wherein the controller is further configured to perform, when the interference channel does not support the predetermined TM, the blind detection with a group of physical cell identifier-scrambling identifier (PCID-SCID) combinations of the interference channel.

* * * * *